(12) United States Patent
Nagai et al.

(10) Patent No.: US 10,151,624 B2
(45) Date of Patent: Dec. 11, 2018

(54) COMBINATION SCALE

(71) Applicant: YAMATO SCALE CO., LTD., Akashi-shi, Hyogo (JP)

(72) Inventors: Takayuki Nagai, Akashi (JP); Masafumi Takimoto, Akashi (JP)

(73) Assignee: Yamamoto Scale Co., Ltd., Hyogo (JP)

(*) Notice: Subject to any disclaimer, the term of this patent is extended or adjusted under 35 U.S.C. 154(b) by 0 days.

(21) Appl. No.: 15/317,059

(22) PCT Filed: Dec. 9, 2015

(86) PCT No.: PCT/JP2015/006149
§ 371 (c)(1),
(2) Date: Dec. 7, 2016

(87) PCT Pub. No.: WO2017/098540
PCT Pub. Date: Jun. 15, 2017

(65) Prior Publication Data
US 2018/0274969 A1 Sep. 27, 2018

(51) Int. Cl.
G01G 23/01 (2006.01)
G01G 19/393 (2006.01)
G01G 23/14 (2006.01)
B65B 37/18 (2006.01)

(52) U.S. Cl.
CPC ............ G01G 23/01 (2013.01); B65B 37/18 (2013.01); G01G 19/393 (2013.01); G01G 23/14 (2013.01)

(58) Field of Classification Search
CPC ...... G01G 23/01; G01G 23/14; G01G 19/393; G01G 19/387; B65B 37/18
See application file for complete search history.

(56) References Cited

U.S. PATENT DOCUMENTS

| 4,344,492 A | * | 8/1982 | Hirano | G01G 13/00 177/145 |
| 4,618,013 A | * | 10/1986 | Yamano | G01G 19/32 177/1 |
| 4,627,504 A | | 12/1986 | Moran | |
| 4,722,406 A | * | 2/1988 | Naito | G01G 3/142 177/211 |
| 2009/0294183 A1 | * | 12/2009 | Kawanishi | G01G 19/393 177/25.18 |

FOREIGN PATENT DOCUMENTS

| JP | 6-317457 A | 11/1994 |
| JP | 2011-47908 A | 3/2011 |
| JP | 2011-131899 A | 7/2011 |
| JP | 2011-145106 A | 7/2011 |
| JP | 2012-229977 A | 11/2012 |

* cited by examiner

*Primary Examiner* — Manuel L Barbee
(74) *Attorney, Agent, or Firm* — Norris McLaughlin, P.A.

(57) ABSTRACT

A virtual weight value is set, and a dummy run mode is set and activated. Then, a zero point, reference value used to calculate the weight value of articles to be weighed in each weighing hopper, is corrected based on the virtual weight value. This enables a dummy run of a combination scale to be performed with the actually empty weighing hopper being assumed to contain the articles equivalent to the virtual weight value.

7 Claims, 13 Drawing Sheets

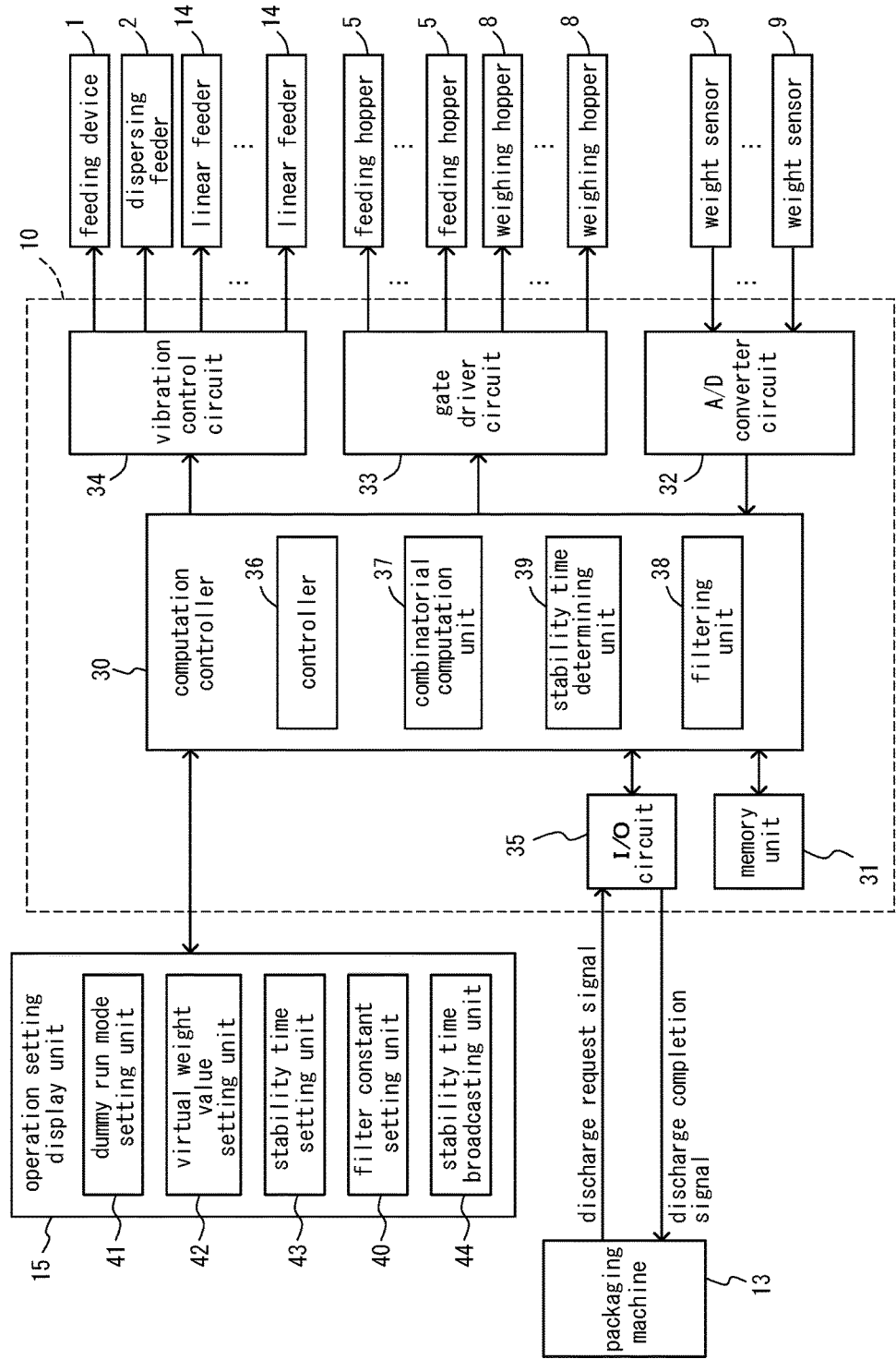
F I G. 2

COMBINATION SCALE

TECHNICAL FIELD

The invention relates to a combination scale configured to weigh articles to be weighed such as snacks or fruits and then combine them so as to become a predetermined quantity.

BACKGROUND ART

Conventionally, combination scales are structurally characterized as described below. A dispersing feeder receives articles to be weighed and feeds them into a plurality of linear feeders around the dispersing feeder. The linear feeders deliver the received articles outwardly into a plurality of feeding hoppers. The feeding hoppers temporarily store therein the articles to be weighed and open their discharge gates to feed the articles into a plurality of weighing hoppers disposed below the feeding hoppers.

A combination scale weighs the articles in the weighing hoppers and executes combinatorial computations in which weight values of the articles are variously combined to select an optimal quantity combination of weigh hoppers having a combinational weight, weights of the combined articles in total, equal to or most approximate to a target combinational weight from among these combinations. Then, the combination scale discharges the weighed articles from the optimal quantity combination of weighing hoppers selected by the combinatorial computations (for example, refer to the patent literature 1).

PRIOR ART DOCUMENT

Patent Literature

Patent Literature 1: JP 2012-229977 A

SUMMARY OF THE INVENTION

Technical Problems

In case such a combination scale is installed in the field site, one may want to perform a dummy run for operational check without actually feeding the combination scale with articles to be weighed.

This invention is directed to enabling a dummy run of a combination scale to be performed by simple operational steps without actually feeding the combination scale with articles to be weighed.

Solutions to the Problems

To this end, the invention provides the technical and structural features described below.

1) A combination scale according to this invention includes:
- a dispersing feeder configured to receive and convey articles to be weighed to its periphery;
- a plurality of linear feeders disposed around the dispersing feeder and configured to deliver the articles received from the dispersing feeder and discharge the articles from delivery terminal ends thereof;
- a plurality of feeding hoppers configured to temporarily store therein the articles discharged from the delivery terminal ends of the linear feeders and discharge the articles downward;
- a plurality of weighing hoppers configured to temporarily store therein the articles discharged from the feeding hoppers and discharge the articles;
- a plurality of weight sensors configured to detect weights of the weighing hoppers;
- a combinatorial computation unit configured to correct weight values obtained from weight signals of the weight sensors based on zero-point correction values respectively associated with the weighing hoppers, the combinatorial computation unit being further configured to calculate weight values of the articles stored in the weighing hoppers and execute combinatorial computations based on the calculated weight values of the articles; and
- a control device configured to control the weighing hoppers based on a result obtained from the combinatorial computations, the control device being further configured to control the dispersing feeder, the linear feeders, and the feeding hoppers, the combination scale further including:
- a dummy run mode setting unit configured to set a dummy run mode for a dummy run of the combination scale to be performed without actually feeding the combination scale with the articles to be weighed; and
- a virtual weight value setting unit configured to set virtual weight values of the articles assumed to be stored in the weighing hoppers that are actually empty, wherein
- during the dummy run mode, the combinatorial computation unit calculates the weight values of the articles by correcting the weight values obtained from the weight signals of the weight sensors based on corrected zero-point correction values, the corrected zero-point correction values being obtainable by correcting the zero-point correction values initially provided based on the virtual weight values.

According to the invention the virtual weight value setting unit sets the virtual weight values. The dummy run mode setting unit sets and activates the dummy run mode. The combinatorial computation unit uses the corrected zero-point correction values obtained by correcting the initially-provided zero-point correction values based on the virtual weight values as the zero-point correction values used for calculating the weight values of the articles in the weighing hoppers. The combinatorial computation unit calculates the weight values of the articles in the weighing hoppers based on the corrected zero-point correction values. Thus, the zero point, reference point of weight calculation, is shifted correspondingly to each virtual weight value to calculate the weight value. This may enable the combinatorial computations with the actually empty weighing hoppers being assumed to contain the articles equivalent to the virtual weight values.

In accordance with the combinatorial computation result based on the virtual weight values, the control device controls the weighing hoppers and accordingly controls the feeding hoppers, linear feeders, and dispersing feeder. As a result, a dummy run of the combination scale may be successfully performed without feeding the combination scale with the articles to be weighed.

2) In preferred embodiments of this invention, the zero-point correction values initially provided include tare weights obtained from the weight signals of the weight sensors when the weighing hoppers are empty, and the corrected zero-point correction values include values obtained by correcting the tare weights so that the weight values of the articles calculated by the combinatorial computation unit are equal to the virtual weight values set by the virtual weight value setting unit.

According to this embodiment, as with the prior art, the initially-provided zero-point correction values may include the tare weights obtained when the weighing hoppers are empty, i.e., summed weights of the respective weighing hoppers and of support members supporting the weighing hoppers.

The corrected zero-point correction values result from correcting the tare weights so that the weight values of the articles calculated by the combinatorial computation unit are equal to the virtual weight values. During the dummy run mode, therefore, the virtual weight values set by the virtual weight value setting unit are calculated as the weight values of the articles in the weighing hoppers that are actually empty.

3) In other embodiments of this invention, the combination scale further includes a filtering unit configured to filter the weight signals of the weight sensors, wherein the combinatorial computation unit obtains the weight values from the weight signals filtered by the filtering unit.

According to these embodiments, the weight values may be obtainable from the weight signals of the filtered and stabilized weight signals of the weight sensors from which vibrational and/or other unwanted components have been removed.

4) In an embodiment of this invention, the combination scale further includes:
a stability time setting unit configured to set stability time that defines a timing of obtaining the weight value from each of the weight signals filtered by the filtering unit; and
a stability time determining unit configured to determine during the dummy run mode whether the stability time previously set is adequate, wherein
the stability time determining unit determines during the dummy run mode whether the stability time previously set is adequate based on the weight values of the articles calculated by the combinatorial computation unit and the virtual weight values set by the virtual weight value setting unit.

According to these embodiments, it may be determinable whether the stability time previously set is adequate during the dummy run mode activated for a dummy run of the combination scale to be performed without actually feeding the combination scale with the articles to be weighed. When the combination scale is installed in the field site, adequacy or inadequacy of the stability time previously set may be determinable by activating the dummy run mode.

5) In preferred embodiments of this invention, the combination scale further includes a stability time broadcasting unit configured to broadcast inadequacy of the stability time previously set when the stability time determining unit determines the stability time as inadequate.

According to these embodiments, inadequacy of the preset stability time, if determined so, is broadcasted to an operator, who is then allowed to reset a stability time more adequate.

6) According to other embodiments of this invention, the filtering unit has filter characteristics variable with a filter constant set therein, the filtering unit including:
a filter constant setting unit configured to set the filter constant of the filtering unit;
a filter constant changing unit configured to change the filter constant previously set so as to have a response time be prolonged and shortened respectively during the dummy run mode; and
a filter constant determining unit configured to determine during the dummy run mode whether the filter constant previously set is adequate based on a length of time required to stabilize each of the weight signals filtered as per the filter characteristics corresponding to the filter constant previously set and a length of time required to stabilize each of the weight signals filtered as per the filter characteristics corresponding to each of the filter constants changed by the filter constant changing unit.

According to these embodiments, it may be determinable whether the filter constant previously set is adequate during the dummy run mode activated for a dummy run of the combination scale to be performed without actually feeding the combination scale with the articles to be weighed. When the combination scale is installed in the field site, adequacy or inadequacy of the filter constant previously set may be determinable by activating the dummy run mode.

7) According to preferred embodiments of this invention, the combination scale further includes a filter constant broadcasting unit configured to broadcast inadequacy of the filter constant previously set when the filter constant determining unit determines the filter constant as inadequate.

These embodiments further provide a scheme for broadcasting and presenting inadequacy of the preset filter constant, if determined so, to an operator, allowing the operator to reset a filter constant more adequate.

Effects of the Invention

According to this invention including: setting the virtual weight values; and setting and activating the dummy run mode, the zero point, reference point when calculating the weight values of the articles in the weighing hoppers, may be correctable based on the virtual weight values, and the structural units of the combination scale may be controllable by executing the combinatorial computations with the actually empty weighing hoppers being assumed to contain the articles equivalent to the virtual weight values. These advantageous structural features may enable a successful dummy run of the combination scale to be performed without actually feeding the combination scale with the articles to be weighed.

BRIEF DESCRIPTION OF THE DRAWINGS

FIG. 2 is a schematic block diagram of a control system of the combination scale according to the embodiment.

DETAILED DESCRIPTION OF THE EMBODIMENTS

First Embodiment

Hereinafter, embodiments of this invention are described in detail referring to the accompanying drawings.

Figure 1:
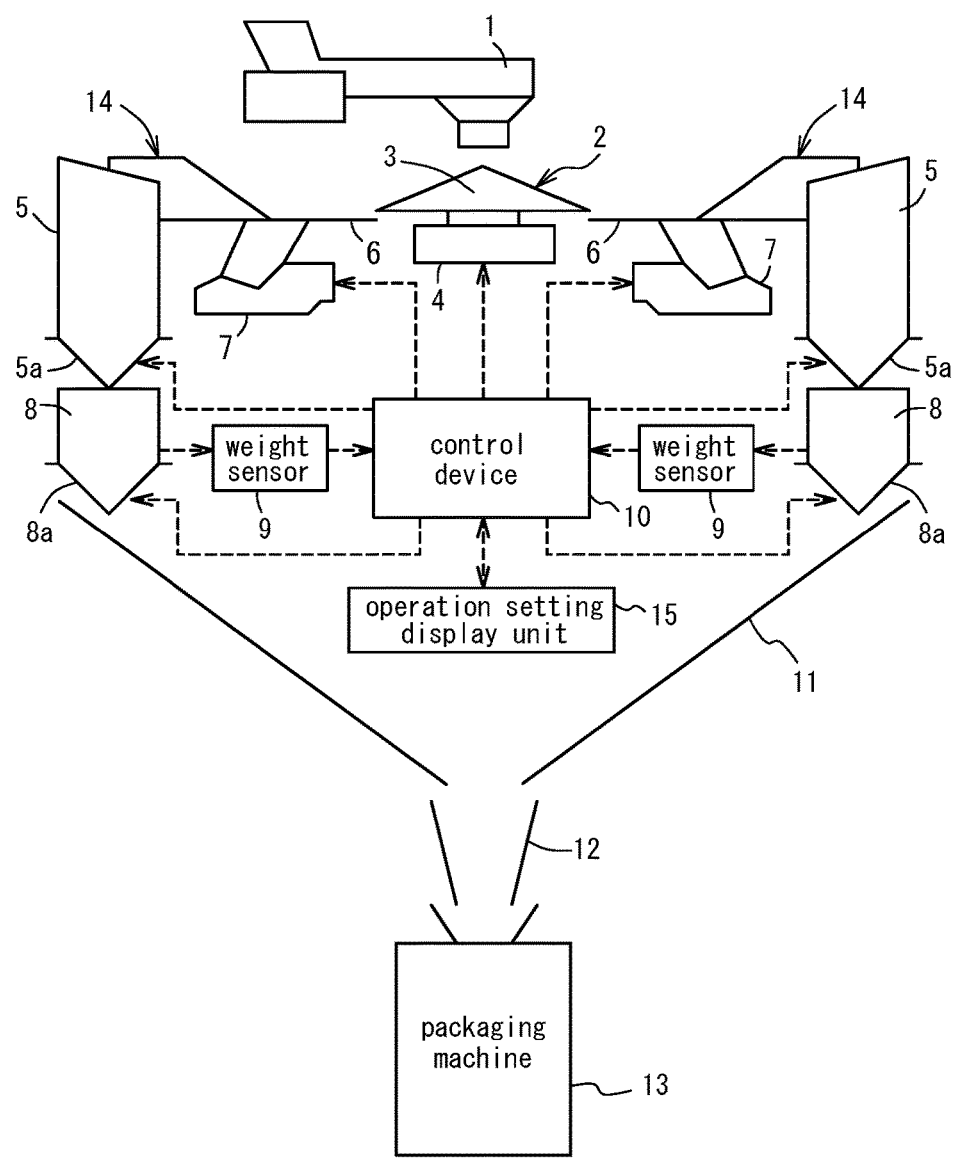
FIG. 1 is a schematic structural drawing of a combination scale according to an embodiment of the invention.

FIG. 1 is a schematic structural drawing of a combination scale according to an embodiment of the invention.

The combination scale according to this embodiment has a dispersing feeder 2 at the center in its upper section. The dispersing feeder 2 radially disperses by way of vibrations articles to be weighed fed from a feeding device 1. The dispersing feeder 2 has a conical top cone 3 to be fed with the articles, and a vibration mechanism 4 that vibrates the top cone 3.

The articles to be weighed are transported on a belt conveyer, not illustrated in the drawing, to the feeding device 1. The feeding device 1 feeds the received articles by way of vibrations to a central section of the top cone 3. The articles delivered from the feeding device 1 and received by the top cone 3 in its central section are moved by way of vibrations toward the peripheral edge of the top cone 3.

Around the top cone 3 are radially disposed a plurality of linear feeders 14. The linear feeders 14 receive the articles from the top cone 3 and deliver them linearly outward by way of vibrations. The linear feeders 14 each have a gutter-shape feeder pan 6 to be fed with the articles, and a vibration mechanism 7 that drives the feeder pan 6 to vibrate.

On the peripheral edges of the feeder pans 6 are circumferentially disposed a plurality of feeding hoppers 5, and a plurality of weighing hoppers 8 arranged correspondingly to the feeder pans 6 The feeding hoppers 5 each have, at its lower opening, an openable and closable gate 5a for discharge. The weighing hoppers 8 each have, at its lower opening, an openable and closable gate 8a for discharge.

The feeding hopper 5 temporarily stores therein the articles received from the feeder pan 6. The feeding hopper 5, when the weighing hopper 8 therebelow becomes empty, opens the discharge gate 5a to feed the articles into the weighing hopper 8. The weighing hoppers 8 are each coupled to and supported by a weight sensor 9, examples of which may include a load cell. The weight sensors 9 weigh the articles in the respective weighing hoppers 8. The weight sensors 9 output weight signals to a control device 10.

The linear feeder 14, feeding hopper 5, weighing hopper 8, and weight sensor 9 constitute a set of weighing heads. The combination scale has a plurality of weighing heads; 14 weighing heads in this example.

The control device 10 converts, through AD conversion, analog weight signals outputted from the weight sensors 9 into digital weight signals at predetermined time intervals and further filters the converted weight signals to obtain weight values. The control device 10 corrects the obtained weight values based on zero-point correction values when the weighing hoppers 8 are empty (tare weights) to calculate the weight values of the articles in the weighing hoppers 8.

The control device 10 executes combinatorial computations based on the calculated weight values of the articles, and selects, from all of the weighing hoppers 8, an optimal quantity combination of weighing hoppers 8 from which the articles should be discharged. In response to a discharge request signal inputted from a packaging machine 13, the control device 10 opens the discharge gates 8a of the selected optimal quantity combination of weighing hoppers 8 to discharge the articles into a collecting chute 11. The articles thus discharged are thrown into the packaging machine 13 through a collecting funnel 12 below the collecting chute 11, and then packaged.

An operation setting display unit 15 according to this embodiment including, for example, a touch panel, is in charge of manipulating the combination scale and setting operational parameters such as filter constants and stability time that defines a timing of obtaining the weight value from the filtered weight signal. The operation setting display unit 15 displays, on a screen, a speed of operation, a combinational weight value, and other set values. The operation setting display unit 15 further includes functions of a broadcasting unit that broadcasts an indication of an inadequate operational parameter, if determined as inadequate.

The control device 10 controls the operation of the feeding device 1 and the general operation of the whole combination scale, and executes filtering and combinatorial computations. The combinatorial computations according to this embodiment include selecting an optimal quantity combination of weighing hoppers 8 from all of the weighing hoppers 8. The optimal quantity combination of weighing hoppers 8 selected then is a combination of weighing hoppers 8 whose combinational weight resulting from variously combining the weight values of the articles is equal to a target combinational weight or heavier than and most approximate to the target combinational weight.

FIG. 2 is a schematic block diagram of a control system of the combination scale according to this embodiment, wherein the same structural elements as those of FIG. 1 are illustrated with the same reference signs.

The control device 10 includes a computation controller 30, a memory unit 31, an AD converter circuit 32 that receives the inputted analog weight signals of the weight sensors 9 respectively supporting the weighing hoppers 8, a gate driver circuit 33 that drives the discharge gates 5a and 8a of the feeding hoppers 5 and the weighing hoppers 8, a vibration control circuit 34 that controls the vibrations of the feeding device 1 and the feeders 2 and 14, and an I/O circuit 35 connected to the packaging machine 13.

The computation controller 30 includes a CPU. The computation controller 30 controls the respective structural elements and executes combination and filtering-associated computations. The computation controller 30 includes functions of a controller 36, a combinatorial computation unit 37, and a filtering unit 38. According to this embodiment, the computation controller 30 includes functions of a stability time determining unit 39 that determines whether stability time, a previously set operational parameter, is adequate. The memory unit 31 stores therein operation programs and settable operational parameters of the combination scale. The memory unit 31 further serves as a work region for the computation controller 30 to execute the computations.

The AD converter circuit 32 converts the analog weight signals outputted from the weight sensors 9 that detected the weights of the articles in the weighing hoppers 8 into digital weight signals by sampling the signals at predetermined time intervals and then outputs the converted digital weight signals to the computation controller 30.

The computation controller 30 and the memory unit 31 constitute a filtering unit 38 that filters the digital weight signals outputted from the AD converter circuit 32. The filtering unit 38 is a digital filter such as an FIR filter or a moving average filter that performs multi-moving averaging.

The filtering unit 38 is a variable filter by which the digital weight signals are filtered as per filter characteristics corresponding to a set filter constant. The filter constant may be settable by manipulating the operation setting display unit 15 including functions of a filter constant setting unit 40. The filter constant decides the filter characteristics of the filtering unit 38, examples of which may include number of taps, filter factor, and filter order.

The gate driver circuit 33, based on control signals outputted from the computation controller 30, opens and closes the discharge gates 5a and 8a of the feeding hoppers 5 and the weighing hoppers 8. The vibration control circuit 34, based on the control signals outputted from the computation controller 30, controls the vibrations of the feeding device 1, dispersing feeder 2, and linear feeders 14. The computation controller 30 is connected to the operation setting display unit 15 to allow for mutual communication therebetween.

The computation controller 30 runs the operation programs stored in the memory unit 31, and the control device 10 thereby controls the general operation of the whole combination scale.

An operator, by manipulating the operation setting display unit 15, sets a large number of various operational parameters required to be set in the combination scale. The values of the set operational parameters are transmitted to the computation controller 30 and stored in the memory unit 31. The operational parameters to be set may include stability time that defines a timing of obtaining the weight value from the filtered weight signal, filter constant of the filtering unit 38, a target combinational weight value obtained by the combinatorial computations as well as its allowable range, and vibration intensities and lengths of driving time of the feeders 2 and 14.

This embodiment provides for the technical features described below to enable a dummy run of the combination scale installed in the field site to be performed by simple operational steps without actually feeding the combination scale with articles to be weighed.

The operator, by manipulating the operation setting display unit 15 including functions of a dummy run mode setting unit 41, sets the dummy run mode for a dummy run of the combination scale to be performed without actually feeding the combination scale with articles to be weighed. Then, the operator sets the virtual weight values, which are weight values of the articles virtually fed in the weighing hoppers 8, by manipulating the operation setting display unit 15 including functions of a virtual weight value setting unit 42. The operation setting display unit 15 further includes functions of a stability time setting unit 43 that sets stability time defining a timing of obtaining the weight value from the filtered weight signal.

According to this embodiment, when the stability time previously set is determined as inadequate during the activated dummy run mode, an indication of such is displayed on the operation setting display unit 15 to be presented to the operator, which will be described later. The operation setting display unit 15 includes functions of a stability time broadcasting unit 44 that broadcasts inadequacy of the stability time, if determined so. The broadcasting means is not necessarily limited to the display of such an indication. Instead, the operator may be advised of the inadequate stability time by audio output, print output, or any other suitable means.

Figure 3:
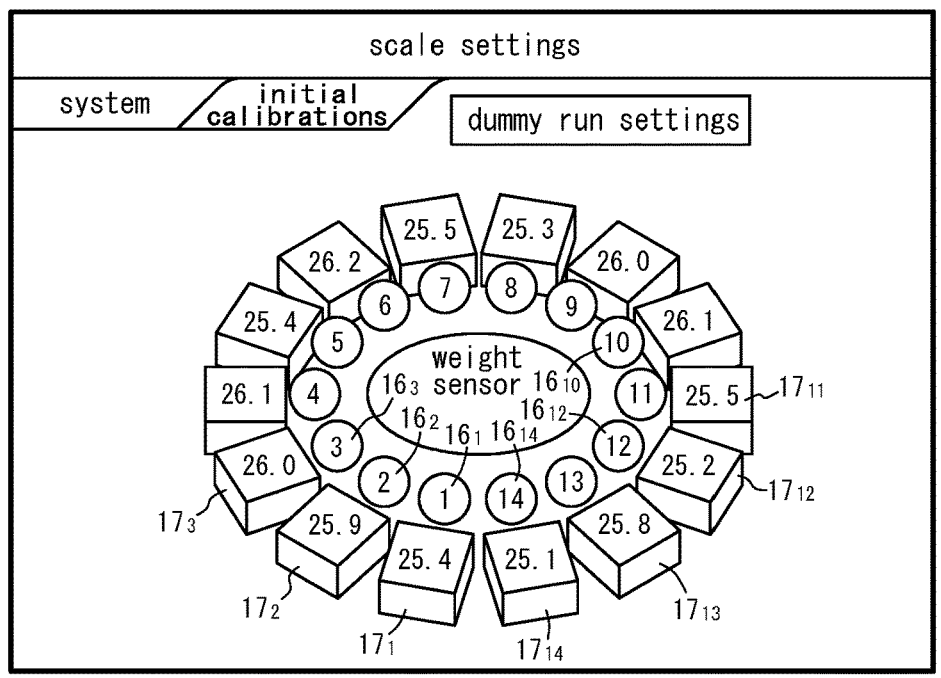
FIG. 3 is a drawing of an exemplified display screen for setting a dummy run mode.

FIG. 3 shows an exemplified setting display screen displayed on the operation setting display unit 15 to set the dummy run mode.

The dummy run mode is for a dummy run of the combination scale to be performed without actually feeding the combination scale with the articles to be weighed. During the dummy run mode, i.e., a dummy run of the combination scale, it is necessary to operate the combination scale, assuming that the weighing hoppers 8, though actually empty, contain the articles to be weighed. To this end, the weights of the articles virtually fed in the weighing hoppers 8 are set as virtual weight values.

FIG. 3 shows an exemplified setting display screen displayed on the operation setting display unit 15 to set the virtual weight values.

Referring to FIG. 3, numbers "1" to "14" signifying the weight sensors 9 arranged correspondingly to the 14 weighing hoppers 8 of the combination scale are displayed in 14 circular number display regions $16_1$ to $16_{14}$ circumferentially arranged. On the outer peripheral side of the number display regions $16_1$ to $16_{14}$ are displayed blockish virtual weight value display regions $17_1$ to $17_{14}$ correspondingly to the number display regions $16_1$ to $16_{14}$. The set virtual weight values are displayed on the virtual weight value display regions $17_1$ to $17_{14}$.

In the illustrated example, different virtual weight values are set for the respective weighing hoppers 8; "25.4 (g)" for the first weighing hopper 8 numbered "1", "25.9 (g)" for the second weighing hopper 8 numbered "2", "26.0 (g)" for the third weighing hopper 8 numbered "3", and the same goes for the rest of the weighing hoppers 8, ending with "25.1 (g)" for the 14th weighing hopper 8 numbered "14".

The first weighing hopper 8 numbered "1" are virtually fed with the articles that weigh "25.4 (g)", the second weighing hopper 8 numbered "2" are virtually fed with the articles that weigh "25.9 (g)", the third weighing hopper 8 numbered "3" are virtually fed with the articles that weigh "26.0 (g)", and the same goes for the rest of the weighing hoppers 8, ending with the 14th weighing hopper 8 numbered "14" virtually fed with the articles that weigh "25.1 (g)".

For the virtual weight values to be set in this example, the operator sets an average weight value of the articles to be fed in the first to 14th weighing hoppers 8 by manipulating the operation setting display unit 15. Then, the computation controller 30 automatically varies the average weight value to calculate and set the virtual weight values of the first to 14th weighing hoppers 8

Figure 4:
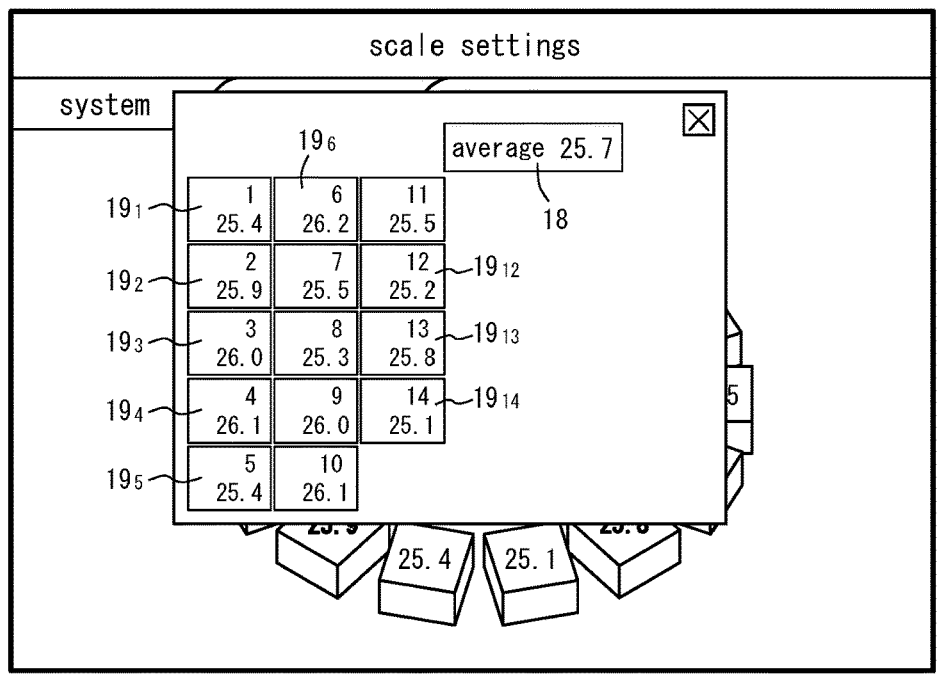
FIG. 4 is a drawing of an exemplified display screen for setting virtual weight values during the dummy run mode.

FIG. 4 shows an exemplified setting display screen to automatically set the virtual weight values as per the average virtual weight value.

As illustrated in FIG. 4, the operator sets, for example, "25.7 (g)" as the average weight value of the articles to be virtually fed in the first to 14th weighing hoppers 8, and the set average weight value is displayed on a rectangular average value display region 18. The computation controller 30 varies the set average weight value to automatically calculate the virtual weight values for the first to 14th weighing hoppers 8, and displays the calculated virtual weight values in the rectangular display regions $19_1$ to $19_{14}$, with the numbers "1" to "14" of the weighing hoppers 8. This embodiment, instead of directly setting the virtual weight values, indirectly sets the virtual weight values by way of the previously obtained average weight value of the articles to be fed in the weighing hoppers 8.

The average weight value of the articles to be fed in the weighing hoppers 8, i.e., target weight value of the articles to be fed in the weighing hoppers 8, may preferably be calculated as described below to have as many effective combinations as possible in the combinatorial computations for a higher combination accuracy.

As for n number in total of weighing hoppers 8 where n is an odd number, a weight value calculated by dividing the target combinational weight by (n−1)/2 or (n+1)/2 should be the target weight value of the articles to be fed in the weighing hoppers 8. When the total number n is an even number, a weight value calculated by dividing the target combinational weight by n/2 should be the target weight value of the articles to be fed in the weighing hoppers 8.

According to this embodiment wherein the total number n of the weighing hoppers 8 is 14, a weight value calculated by dividing the target combinational weight by 7 (=14/2) should be the target weight value of the articles to be fed in the weighing hoppers 8, i.e., average weight value of the articles to be fed in the weighing hoppers 8.

The total number n of the weighing hoppers 8 is a known number. When the operator activates the dummy run mode and inputs the target combinational weight, the computation controller 30 may divide the target combinational weight by (n−1)/2, (n+1)/2, or n/2 to calculate the average weight value of articles to be fed in the weighing hoppers 8, and then automatically vary the calculated average weight value to obtain the virtual weight values. Thus, the operator, instead of directly setting the virtual weight values, may activate the dummy run mode and input the target combinational weight value to have the virtual weight values be automatically calculated and indirectly set.

Figure 5:
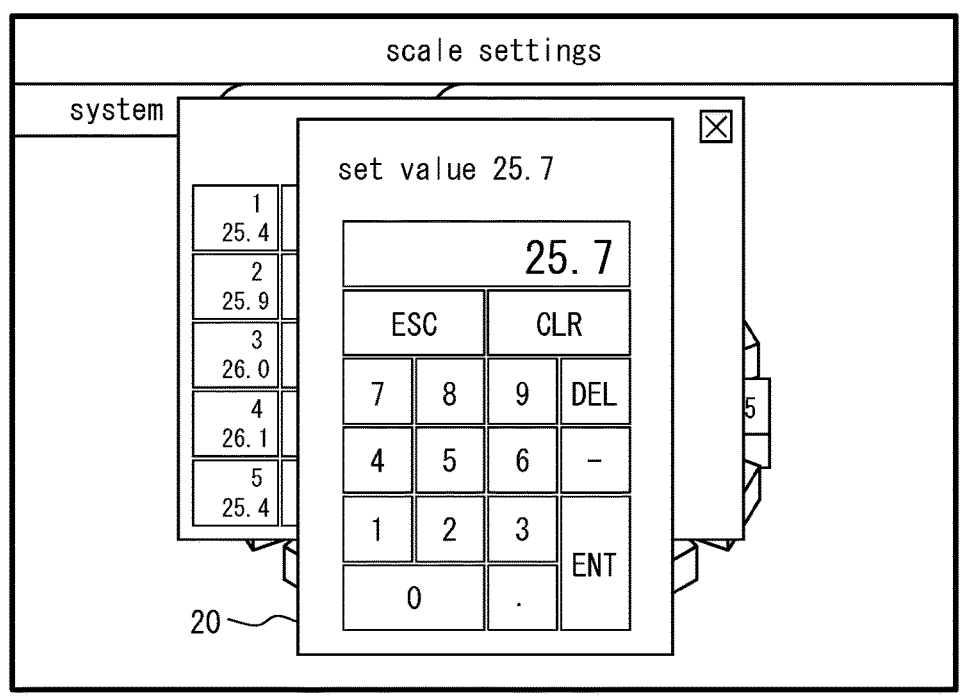
FIG. 5 is a drawing of another exemplified display screen for setting virtual weight values during the dummy run mode.

This embodiment may include an option illustrated on the exemplified setting display screen of FIG. 5; a numeric keypad window 20 may be invoked to directly and individually set the virtual weight values of the weighing hoppers 8.

The dummy run mode enables a dummy run of the combination scale to be performed with the actually empty weighing hoppers 8 being assumed to contain the articles of the virtual weights thus calculated and set.

This embodiment calculates the weight values of the articles to be weighed during the dummy run mode as described below.

Initially provided zero-point correction values (zero-point calibration values), which are used to calculate the weight values of the articles fed in the weighing hoppers 8, are corrected based on the set virtual weight values, and the corrected zero-point correction values are used to calculate the weight values of the articles to be weighed.

Conventionally, tare weights (summed weights of the weighing hoppers 8 and of support members supporting the weighing hoppers 8) are decided so that the weight values obtained from the weight signals of the weight sensors 9 when the weighing hoppers 8 are empty become zero after the tare weights are subtracted from the weight values. Then, these tare weights are used as the initial zero-point correction values (zero-point calibration values).

To weigh the zero point-adjusted articles, the initial zero-point correction values, or tare weights, are subtracted from the weight values obtained from the weight signals of the weight sensors 9, and the resulting weight values are multiplied by a span coefficient K, conversion factor for weight calculation, to calculate the articles fed in the weighing hoppers 8.

When the weighing hoppers 8 are empty with the articles unfed therein, the initial zero-point correction values, tare weights, are subtracted from weight values obtained from the weight signals of the weight sensors 9 arranged correspondingly to the weighing hoppers 8. Then, the calculated weight values of the articles in the weighing hoppers 8 are "0 (g)".

According to this embodiment, the initial zero-point correction values are corrected during the dummy run mode based on the set virtual weight values to calculate the corrected zero-point correction values. The corrected zero-point correction values are the initial zero-point correction values corrected so that the virtual weight values are calculated as the weight values of the articles in the weighing hoppers 8 that are actually empty.

Assuming that, in the initial zero-point adjustment, 100 g is the weight value obtained from the weight signal of the weight sensor 9 arranged correspondingly to the actually empty weighing hopper 8, this weight, 100 g, is the tare weight, i.e., summed weight of the weighing hopper 8 and of support members supporting the weighing hopper 8. Then, 100 g is stored as the initial zero-point correction values ($Wzi$).

To weigh the zero point-adjusted articles, the initial zero-point correction value ($Wzi$) is subtracted from the weight value ($Wm$) obtained from the weight signal of the weight sensor 9, and the resulting weight value is multiplied by the span coefficient K, conversion factor for weight calculation, to calculate the weight value ($Wm$) of the articles to be weighed. This is expressed by the following formula.

$$Wn = K \cdot (Wm - Wzi)$$

For better understanding, the following formula expresses the calculation of the weight value ($Wn$), 25 g, of the articles, where the span coefficient K=1, and the initial zero-point correction value ($Wzi$), 100g, is substrated from the weight value ($Wm$), 125 g, obtained from the weight signal of the weight sensor 9.

$$Wn = Wm - Wzi = 125 - 100 = 25$$

According to this embodiment, the initial zero-point correction value ($Wzi$) is corrected so that the virtual weight value ($Ws$) is calculated as the weight value ($Wn$) of the articles in the actually empty weighing hopper 8.

If the initial zero-point correction value ($Wzi$) is 100 g, and the set virtual weight value ($Ws$) is 25.5 g, the corrected zero-point correction value ($Wzir$) is calculated to satisfy the following formula.

$$25.5 = 100 - Wzir$$

Therefore, the corrected zero-point correction value ($Wzir$) is calculated by the formula, $Wzir = 100 - 25.5 = 74.5$, correction value of the initial zero-point correction value ($Wzi$) 100 g.

Therefore, the weight value ($Wn$) of the weighing hopper 8 is calculated from the following formula, where the corrected zero-point correction value $Wzir$ is subtracted from the weight value ($Wm$) obtained from the weight signal of the weight sensor 9.

$$Wn = Wm - Wzir$$

Assuming that the weight value ($Wm$) obtained from the weight signal of the weight sensor 9 arranged correspondingly to the actually empty weighing hopper 8 is equal to the initial zero-point correction value, or tare weight, 100 g, the corrected zero-point correction value ($Wzir$), 74.5 g, is subtracted from the weight value (Wm) to calculate the weight value (Wn) of the articles to be weighed. As a result, the virtual weight value (Ws), 25.5 g, is calculated as expressed in the following formula.

$$Wn=Wm-Wzir=100-74.5=25.5=Ws$$

During a dummy run of the combination scale, the virtual weight values are thus calculated as the weights of the articles in the weighing hoppers 8 that are actually empty.

Thus, the initial zero-point for correction is corrected in response to the virtual weight value, in other words, the zero point, reference point of weight calculation, is shifted correspondingly to each virtual weight value. This may enable a dummy run of the combination scale with the actually empty weighing hoppers 8 being assumed to contain the articles equivalent to the virtual weight values.

When the combination scale is normally operating with the articles to be weighed being actually fed therein, the articles may be stuck in and left undischarged from any one of the weighing hoppers 8. This may cause the zero point to be variable, possibly resulting in different weight values for the articles of the same weight. To avoid that, the combination scale includes an automatic zero-point adjusting function to update the zero-point correction values at regular intervals. However, the automatic zero-point adjusting function is disabled during the dummy run mode in which the virtual weight values are calculated. During the dummy run mode, therefore, the initial zero-point correction values before the operation starts are not the updated zero-point corrected values, are left at the corrected zero-point correction values corrected based on the virtual weight values, and are unupdated.

When a dummy run starts, the combination scale is operated with the actually empty weighing hoppers 8 being assumed to contain the articles equivalent to the virtual weight values.

After the virtual weight values are set, the operation setting display unit 15 is manipulated to start a dummy run of the combination scale. Then, the computation controller 30 corrects the weight values obtained from the weight signals of the weight sensors 9 arranged correspondingly to the weighing hoppers 8 based on the corrected zero-point correction values, thereby calculating the weight values of the articles to be weighed. The computation controller 30 then executes the combinatorial computations using the calculated weight values of the articles to select an optimal quantity combination.

During a dummy run of the combination scale, the computation controller 30, whenever a discharge timing of the articles arrive at certain time intervals, opens and closes the discharge gates 8a of the optimal quantity combination of weighing hoppers 8 to discharge the articles therefrom with or without the discharge request signal inputted from the packaging machine 13. Next, the computation controller 30 opens and closes the discharge gates 5a of the associated feeding hoppers 5 in order to virtually feed the weighing hoppers 8 with the articles after their gates 8a are opened and closed. Next, the computation controller 30 drives the associated linear feeders 14 over a set period of time to virtually feed the feeding hoppers 5 with the articles after their gates 5a are opened and closed. Then, the computation controller 30 drives the dispersing feeder 2 over a set period of time to virtually feed the linear hoppers 14 with the articles. The computation controller 30 repeatedly performs a weighing cycle of these steps. The weighing cycle is essentially similar to a weighing cycle when the combination scale is normally operating with the articles being actually fed.

The normal operation is supplemented with a dwelling prevention scheme to prevent long-time dwelling of the articles in any weighing hoppers 8 not included in any optimal quantity combination. This dwelling prevention is performed during the dummy run as well.

The dwelling prevention scheme executes the combinatorial computations in which any weighing hoppers 8, after being left unselected a given number of times, are forced to be selected as optimal quantity combinations, so that all of the weighing hoppers 8 are ultimately selected as optimal quantity combinations.

When the combination scale according to this embodiment is installed in the field site, the operation setting display unit 15 is manipulated to activate the dummy run mode, and the dummy run is initiated after the virtual weight values for the weighing hoppers 8 are set. This may enable the operational check of each structural element to be performed during the dummy run without actually feeding the combination scale with the articles to be weighed.

For a dummy run to be performed without actually feeding the combination scale with the articles, it may be contemplated that counter weights equivalent to the article weights are attached to the weighing hoppers 8 securely enough not to fall off when their discharge gates 8a are opened.

This is, however, a complicated and costly burden, requiring such steps as preparing counter weights necessary for the weighing hoppers 8, securely attaching them to the weighing hoppers 8 not to fall off during a dummy run, removing the counter weights from the weighing hoppers 8 when the dummy run is over, and storing and managing them for reuse.

This embodiment, on the other hand, may enable a dummy run to be performed simply by setting the dummy run mode and virtual weight values without actually feeding the combination scale with the articles to be weighed. This embodiment may further advantageously eliminate time-consuming multiple steps for a dummy run of the combination scale; preparing counter weights for the weighing hoppers, securely attaching them to the weighing hoppers, removing the counter weights from the weighing hoppers when the dummy run is over, and storing and managing them for reuse.

It may be advantageously convenient to check during the dummy run whether the previously set operational parameters are adequate.

After the combination scale is installed in the field site, external signals from, for example, floor vibrations, may be superimposed on the weight signals as vibrational components. Therefore, it is desirable for the operator to be able to check, after the installation of combination scale, adequacy or inadequacy of the operational parameters including stability time that defines a timing of obtaining the weight value from each weight signal.

This embodiment, therefore, provides a scheme for determining whether the stability time, which is a previously set operational parameter, is adequate during the dummy run mode activated for a dummy run.

The stability time is specifically a length of time from a starting point to the arrival of a timing of reliably obtaining the weight value from the weight signal of each of the weight sensors 9 for the weighing hoppers 8, wherein the starting point refers to a timing of opening and closing the discharge gate 5a of the feeding hopper 5, e.g., a timing of opening the discharge gate 5a of the feeding hopper 5. The weight signal described here is a weight signal AD-converted by the AD converter circuit 32 and filtered by the filtering unit 38.

When the stability time is over, the weight value is obtained from the filtered weight signal to calculate the weight value of the articles to be weighed based on the corrected zero-point correction value as described earlier.

A dummy run performed without actually feeding the weighing hoppers 8 with the articles to be weighed is free from vibrations that would be produced by the articles transported in the combination scale. Yet, there are vibrations associated with opening and closing of the discharge gates 8a of the weighing hoppers 8 selected as an optimal quantity combination by the combinatorial computations.

Figure 6:
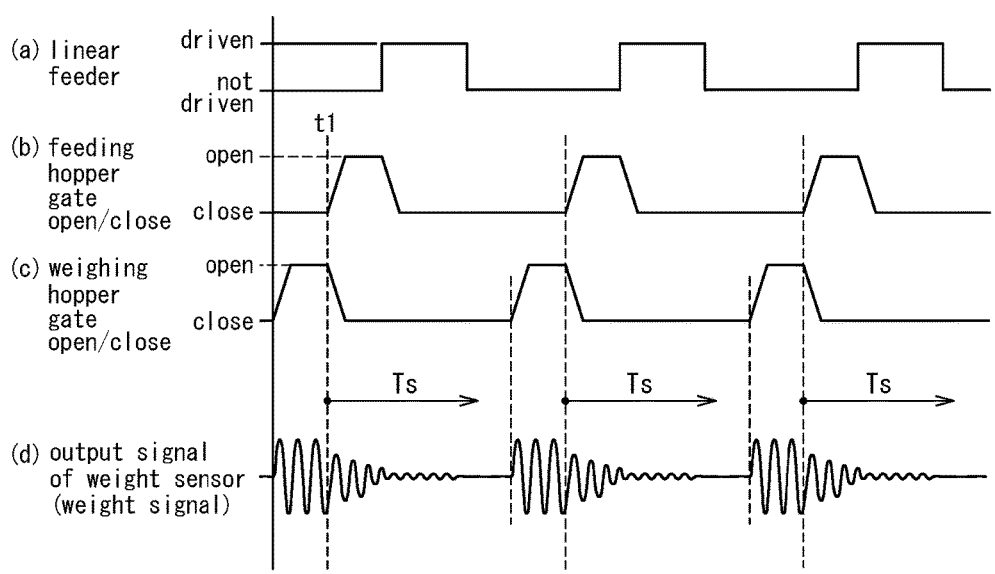
FIG. 6 are timing charts of an exemplified operation during the dummy run mode.

FIGS. 6 are timing charts of an exemplified operation during a dummy run illustrated to describe the stability time. FIG. 6 (a) is a timing chart in relation to a driven state of the linear feeder 14. FIG. 6 (b) is a timing chart of opening and closing of the discharge gate 5a of the feeding hopper 5. FIG. 6 (c) is a timing chart of opening and closing of the discharge gate 8a of the weighing hopper 8. FIG. 6 (d) is a timing chart of the weight signal outputted from the weight sensor 9.

Referring to FIG. 6 (b), a stability time Ts is set, which is a period of time from a starting point, a timing t1, when the discharge gate 5a of the feeding hopper 5 starts to open, to a timing of reliably obtaining the weight value.

As illustrated in FIGS. 6, during the dummy run, the discharge gates 8a are opened and closed as illustrated in FIG. 6 (c) to virtually discharge the articles from a selected optimal quantity combination of weighing hoppers 8. Then, the discharge gates 5a of the associated feeding hoppers 5 are opened and closed as illustrated in FIG. 6 (b) to virtually feed the weighing hoppers 8 with the articles after their gates 8a are opened and closed. Further, the associated linear feeders 14 are driven over a set period of time as illustrated in FIG. 6 (a) in order to virtually feed the feeding hoppers 5 with the articles after their gates 5a are opened and closed.

According to this embodiment, a stability time adequacy/inadequacy determining mode is selected and activated by manipulating the operation setting display unit 15. Then, as described below, the computation controller 30 including functions of the stability time determining unit determines during the dummy run of the combination scale whether the previously set stability time Ts is adequate.

In so far as the previously set stability time Ts is found to be adequate, the vibrations of the filtered weight signal have been fully attenuated and stabilized by the time when the stability time Ts is over. When the stability time Ts is over, therefore, the weight value of the articles obtained from the filtered and stabilized weight signal and corrected based on the corrected zero-point correction value is substantially equal to the preset virtual weight value.

In case the previously set stability time Ts is found to be inadequate, the vibrations of the filtered weight signal have yet to be fully attenuated and still variable when the stability time Ts is over. When the stability time Ts is over, therefore, the weight value of the articles obtained from the filtered weight signal and corrected based on the corrected zero-point correction value is still variable.

According to this embodiment, the weight signal filtered by the filtering unit 38 is subjected to sampling at given sampling intervals to obtain the weight value when the previously set stability time Ts is over, and the obtained weight value is corrected based on the corrected zero-point correction value to obtain the weight value of the articles to be weighed. Then, a difference between the obtained weight value and the associated virtual weight value is calculated. When the calculated difference stays within an allowable range of weights, the weight signal is stable after the stability time Ts passed, and the previously set stability time Ts is determined as adequate. When the calculated difference is beyond the allowable range of weights, the weight signal has yet to be fully attenuated and is still variable after the stability time Ts passed, and the previously set stability time Ts is determined as inadequate. When the previously set stability time Ts is determined as inadequate, an indication of the inadequate stability time is displayed on the operation setting display unit 15 and presented to the operator.

In the field site where the combination scale is installed, external signals resulting from, for example, floor vibrations, may be superimposed on the weight signals as vibrational components. This embodiment determines whether the previously set stability time is adequate during a dummy run, taking into account the condition of the field site including floor vibrations. Therefore, adequacy or inadequacy of the stability time may be easily determinable.

The operation setting display unit 15 displays thereon an indication of the inadequate preset stability time, if determined as inadequate, allowing the operator to reset a stability time more adequate. The stability time setting is carried out as conventionally done.

Whether the stability time Ts is adequate may be determined as described below. The weight signal filtered by the filtering unit 38 is subjected to sampling at given sampling intervals after the previously set stability time passed to obtain a plurality of weight values. The obtained weight value is corrected based on the corrected zero-point correction value to calculate a plurality of weight values of the articles to be weighed, and an average value of these weight values is further calculated. Then, whether the stability time Ts is inadequate is determined depending on whether the calculated average weight value stays within a given range of weights centered on the virtual weight value.

A dummy run performed without feeding the weighing hoppers 8 with the articles to be weighed is free from vibrations that would be produced by feeding the articles. Instead of determining adequacy or inadequacy of the previously set stability time Ts, the stability time Ts may be shortened by an amount of time equivalent to the lack of vibrations that would be produced by feeding the articles to determine whether the shortened stability time Ts is adequate or inadequate. The amount of time equivalent to the lack of article-feeding vibrations may be settable by manipulating the operation setting display unit 15.

Next, steps of the dummy run according to this embodiment are described referring to a flow chart.

Figure 7:
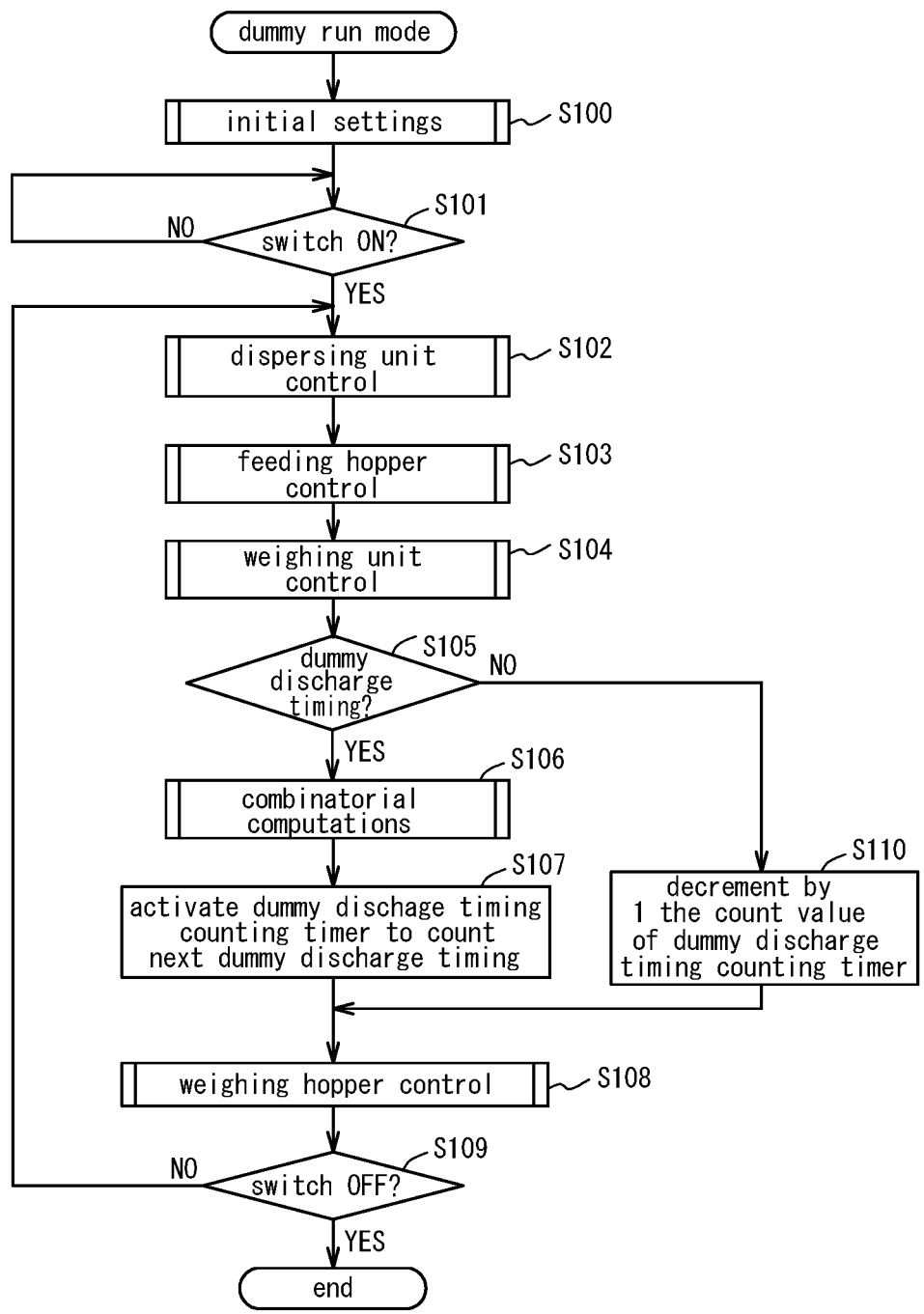
FIG. 7 is a schematic flow chart of processing steps during the dummy run mode.

FIG. 7 is a flow chart schematically illustrating steps of the whole operation during the dummy run mode.

To start with, the operator carries out initial settings necessary for manipulating the operation setting display unit 15 (Step S100). When the operator hits a start switch on the operation setting display unit 15 (Step S101), a dummy run starts. The computation controller 30 of the control device 10 controls a dispersing unit including the dispersing feeder 2 and the linear feeders 14 (Step S102). The control of the dispersing unit includes: vibrating the feeder pans 6 of the linear feeders 14 associated with the empty feeding hoppers 5 after their discharge gates 5a are opened and closed; and feeding the empty feeding hoppers 5 with the articles virtually present on the feeder pans 6. The control of the dispersing unit further includes: vibrating the top cone 3 of the dispersing feeder 2 to disperse the articles to be weighed virtually present on the top cone 3; and virtually feeding the feeder pans 6 with the articles.

Next, the computation controller 30 controls the discharge gates 5a of the feeding hoppers 5 as described below. The computation controller 30 opens the discharge gates 5a of the feeding hoppers 5 associated with the empty weighing hoppers 8 after their discharge gates 8a are opened and closed to virtually feed the empty weighing hoppers 8 with the articles (Step S103).

Next, the computation controller 30 controls a weighing unit as described below. Assuming that the empty weighing hoppers 8 are now fed with the articles to be weighed by opening and closing the discharge gates 5a of the feeding hoppers 5, the computation controller 30 prompts the associated weight sensors 9 to weigh the articles virtually fed in the weighing hoppers 8. Specifically, the computation controller 30 obtains the weight values from the weight signals of the weight sensors 9 and corrects the weight values based on the corrected zero-point correction values to calculate the weight values of the articles (Step S104).

Then, the computation controller 30 determines whether a timing of dummy discharge has arrived to discharge the articles from an optimal quantity combination of weighing hoppers 8 (Step S105). When determined that the timing has not arrived, the computation controller 30 decrements by 1 the count value of a built-in dummy discharge timing counting timer that counts the dummy discharge timing, and then proceeds to Step S108 (Step S110).

When determined in Step S105 that the timing of dummy discharge has arrived, the computation controller 30 executes the combinatorial computations based on the weights of the articles virtually fed in the weighing hoppers 8 as described later (Step S106). As per the combinatorial computations, an optimal quantity combination of weighing hoppers 8 is selected, in which a combinational weight, i.e., summed weight of the virtually fed articles variously combined, is equal to a target combinational weight, or heavier than and most approximate to the target combinational weight. The computation controller 30 then proceeds to Step S107.

In Step S107, the computation controller 30 activates the dummy discharge timing counting timer to start to count the next timing of dummy discharge, and then proceeds to Step S108.

In Step S108, the computation controller 30 controls the weighing hoppers as described below. The computation controller 30 opens the discharge gates 8a of the optimal quantity combination of weighing hoppers 8 selected as per the combinatorial computations to discharge the virtually fed articles from these weighing hoppers 8, and then proceeds to Step S109.

In Step S109, the computation controller 30 determines whether the start switch is turned off. The computation controller 30 returns to Step S102 when determined that the start switch has not been turned off, while ending the dummy run when determined that that the start switch has been turned off.

Figure 8:
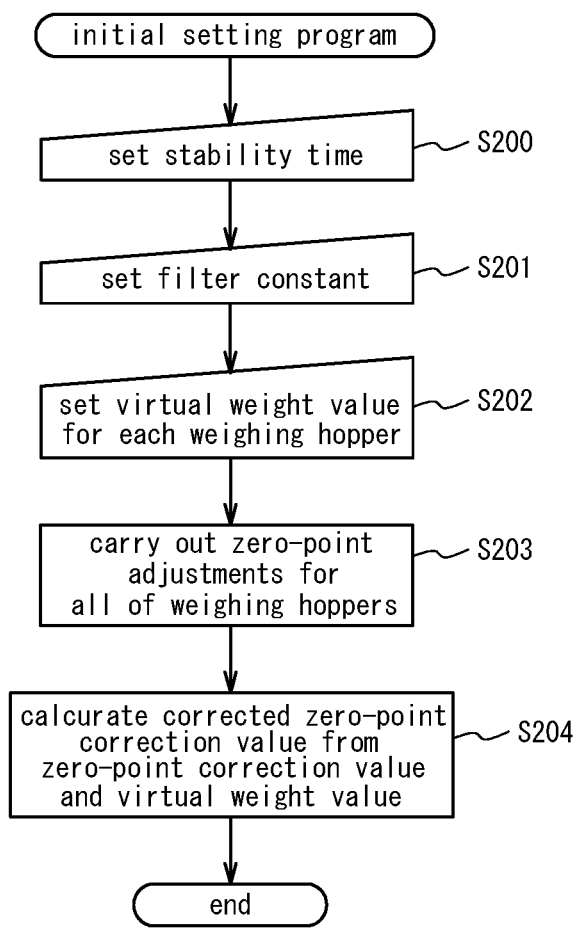
FIG. 8 is a flow chart of initial setting processing steps.

FIG. 8 is a flow chart of steps of an initial setting program in Step S100 of FIG. 7.

First, the operator manipulates the operation setting display unit 15 to set the stability time (Step S200) and to set the filter constant (Step S201). The settings of the stability time and the filter constant are carried out as conventionally done.

Next, the computation controller 30 sets the virtual weight values for the weighing hoppers 8 (Step S202) and performs zero-point adjustments on all of the weighing hoppers 8 to calculate the initial zero-point correction values of the weighing hoppers 8 (Step S203). The computation controller 30 further calculates the corrected zero-point correction values based on the calculated initial zero-point correction values and the virtual weight values. The computation controller 30 then stores the corrected zero-point correction values (Step S204).

Figure 9:
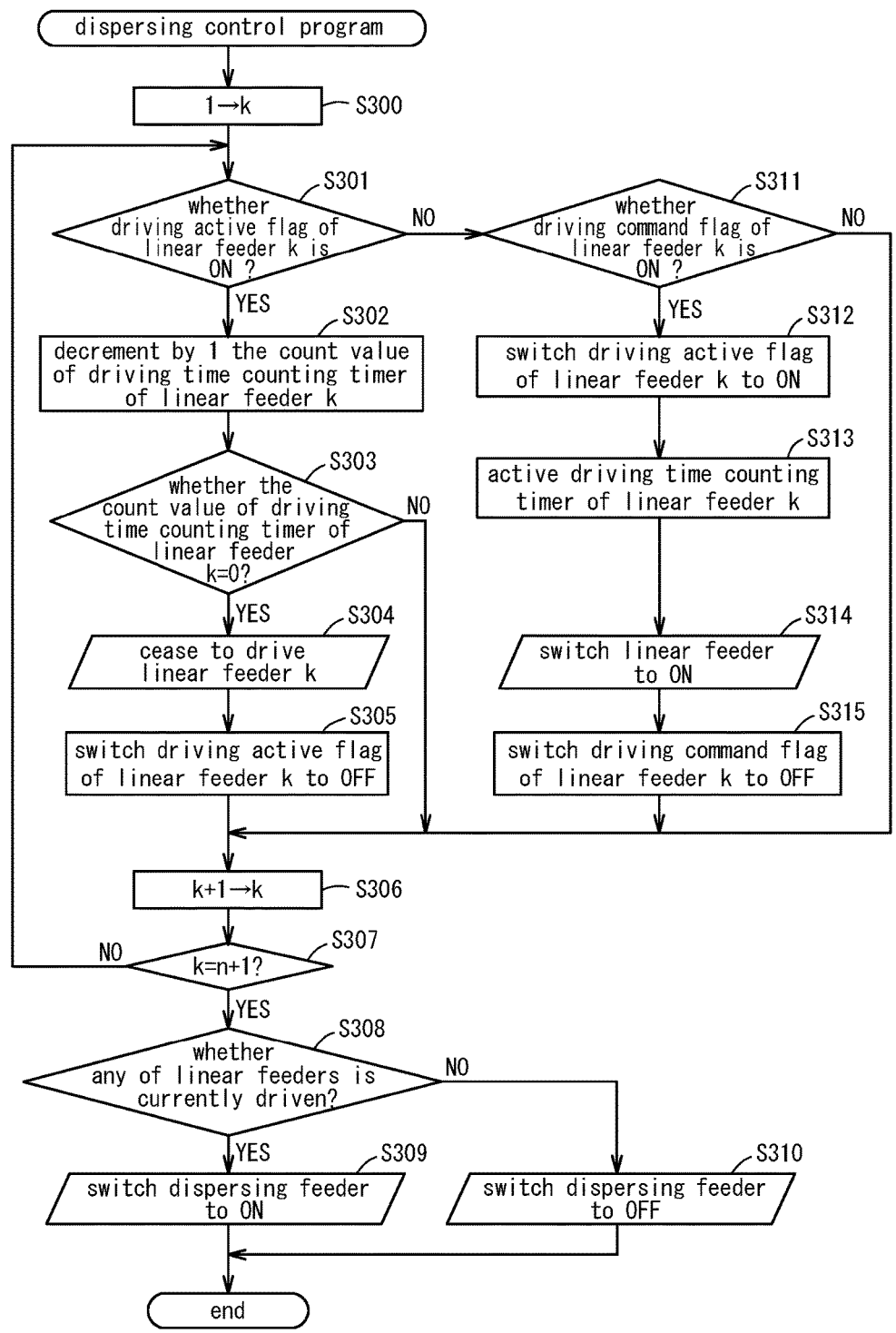
FIG. 9 is a flow chart of steps in connection with a dispersing feeder and linear feeders.

FIG. 9 is a flow chart of steps of a dispersing unit control program in Step S102 of FIG. 7.

First, the computation controller 30 sets an initial value "1" as number k used to identify the first one of the linear feeders 14 (Step S300), and determines whether a driving active flag of the linear feeder 14 (k) is "ON", indicating that the linear feeder 14 (k) is currently driven (Step S301). When determined that the driving active flag is "ON", it is confirmed that the linear feeder 14 (k) is currently driven. Then, the computation controller 30 decrements by 1 the count value of a built-in driving time counting timer associated with the linear feeder 14 (k) to count the driving time of the linear feeder 14 (k) (Step S302), and proceeds to Step S303. This step is performed at regular time intervals, in which the count value of the driving time counting timer is decremented by 1 to count the driving time of the linear feeder 14 (k).

In Step S303, the computation controller 30 determines whether the count value of the driving time counting timer associated with the linear feeder 14 (k) is "0", i.e., whether the driving time counting timer is counted up, indicating that the driving time of the linear feeder 14 (k) is over.

When determined in Step S303 that the count value of the driving time counting timer associated with the linear feeder 14 (k) is "0", the computation controller 30 ceases to drive the linear feeder 14 (k) (Step S304) and switches the driving active flag of the linear feeder 14 (k) to "OFF" (Step S305), and then proceeds to Step S306. When determined in Step S303 that the count value of the driving time counting timer associated with the linear feeder 14 (k) is not "0", the computation controller 30 proceeds to Step S306.

In Step S306, the computation controller 30 adds "1" to the number k that identifies the linear feeder 14 and determines whether the number k equals to "n+1", i.e., whether all of the linear feeders 14 have been processed (Step S307). When determined that the number k is not equal to "n+1", the computation controller 30 returns to Step S301 to process the next linear feeder 14 likewise. When determined in Step S307 that the number k equals to "n+1", the computation controller 30 determines whether any one of the linear feeders 14 is currently driven (Step S308). When determined that any one of the linear feeders 14 is currently driven, the computation controller 30 switches the dispersing feeder 2 to "ON" to start to drive the dispersing feeder 2 or continues to drive the dispersing feeder 2 (Step S309). Then, the processing steps end. When determined in Step S308 that none of the linear feeders 14 is currently driven, the computation controller 30 switches the dispersing feeder 2 to "OFF" to cease to drive the dispersing feeder 2 (Step S310). Then, the processing steps end.

When determined in Step S301 that the driving active flag of the linear feeder 14 (k) is not "ON", the computation controller 30 determines whether a driving command flag of the linear feeder 14 (k) for starting to drive the linear feeder 14 (k) is "ON" (Step S311). When determined that the driving command flag of the linear feeder 14 (k) is "ON", the computation controller 30 switches the driving active flag of the linear feeder 14 (k) to "ON", indicating that the linear feeder 14 (k) is currently driven (Step S312). Then, the computation controller 30 activates the driving time counting timer that counts the driving time of the linear feeder 14 (k) to start to count the driving time (Step S313), and then switches the linear feeder 14 (k) to "ON" to start to drive the linear feeder 14 (k) (Step S314). The computation controller 30 further switches the driving command flag of the linear feeder 14 (k) to "OFF (Step S315), and then proceeds to Step S306.

Figure 10:
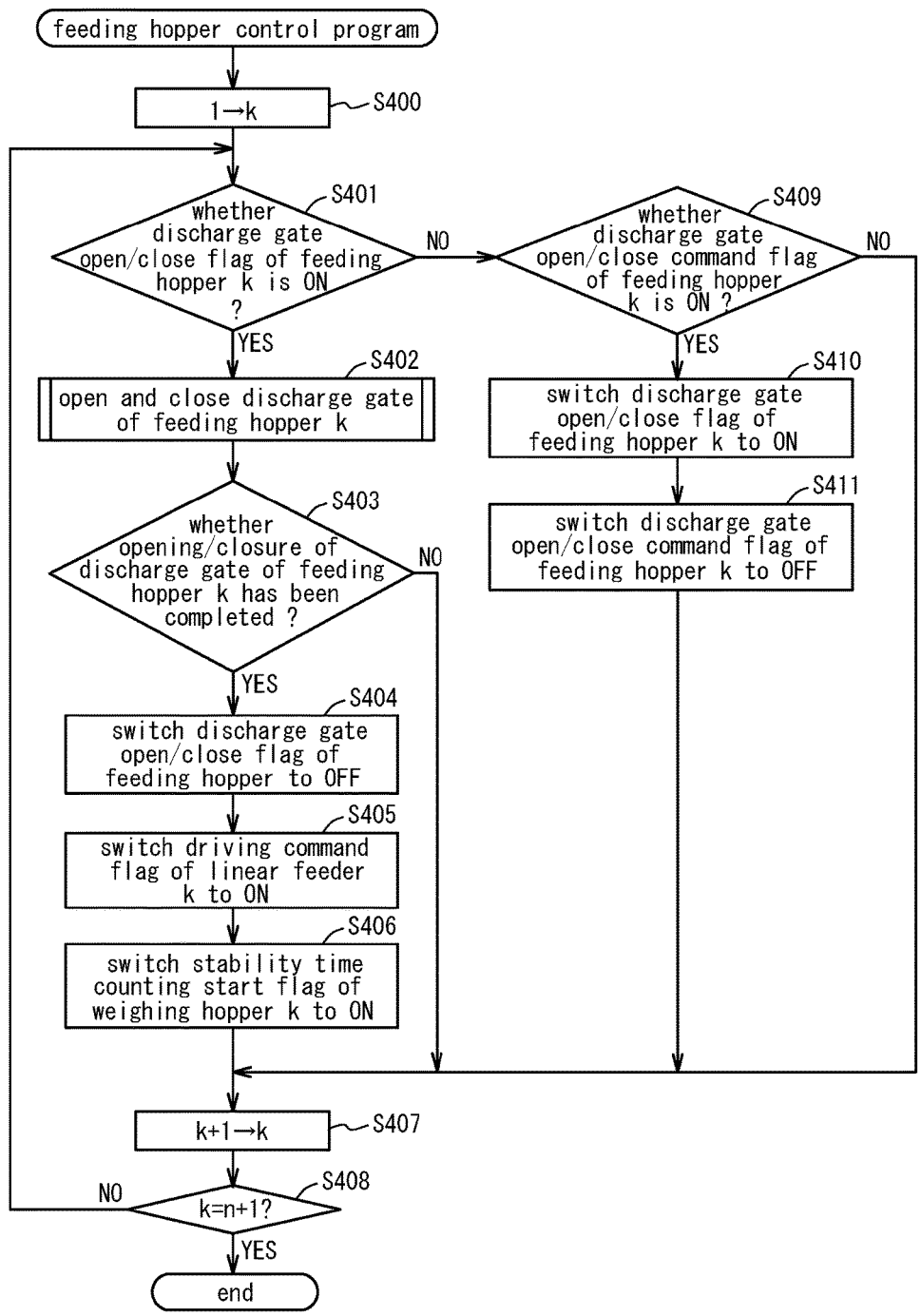
FIG. 10 is a flow chart of processing steps in connection with a feeding hopper.

FIG. 10 is a flow chart of steps of a feeding hopper control program in Step S103 of FIG. 7.

First, the computation controller 30 sets an initial value "1" as number k used to identify the first one of the feeding hoppers 5 (Step S400), and determines whether a discharge gate open/close flag of the feeding hopper 5 (k) is "ON", indicating its discharge gate 5a should be opened and closed (Step S401). When determined that the discharge gate open/close flag is "ON", the computation controller 30 opens and closes the discharge gate 5a of the feeding hopper 5 (k) (Step S402), and then determines whether the opening and closure of the discharge gate 5a of the feeding hopper 5 (k) have been completed (Step S403). When determined that the opening and closure have been completed, the computation controller 30 switches the discharge gate open/close flag of the feeding hopper 5 (k) to "OFF" (Step S404), and then proceeds to Step S405.

At this point, the feeding hopper 5 (k) has had its discharge gate 5a (k) opened and closed to virtually discharge the articles to be weighed. In Step S405, therefore, the computation controller 30, in order to virtually feed new articles to be weighed, switches the driving command flag of the linear feeder 14 (k) associated with the feeding hopper 5 (k) to "ON", and switches a stability time counting start flag of the weighing hopper 8 (k) to "ON" to start to count its stability time (Step S406), thereafter proceeding to Step S407. When determined in Step S403 that the opening and closure of the discharge gate 5a of the feeding hopper 5 (k) have yet to be completed, the computation controller 30 proceeds to Step S407.

When determined in Step S401 that the discharge gate open/close flag of the feeding hopper 5 (k) is not "ON", the computation controller 30 determines whether a discharge gate open/close command flag of the feeding hopper 5 (k) is "ON" (Step S409). When determined that the discharge gate open/close command flag of the feeding hopper 5 (k) is "ON", the computation controller 30 switches the discharge gate open/close flag of the feeding hopper 5 (k) to "ON", indicating that its discharge gate 5a should be opened and closed (Step S410), and switches the discharge gate open/close command flag of the feeding hopper 5 (k) to "OFF" (Step S411), thereafter proceeding to Step S407.

In Step S407, the computation controller 30 adds "1" to the number k that identifies the feeding hopper 5 and determines whether the number k equals to "n+1", i.e., whether all of the feeding hoppers 5 have been processed (Step S408). When determined that the number k is not equal to "n+1", the computation controller 30 returns to Step S401 to process the next feeding hopper 5 likewise. When determined in Step S408 that the number k equals to "n+1", the processing steps end.

Figure 11:
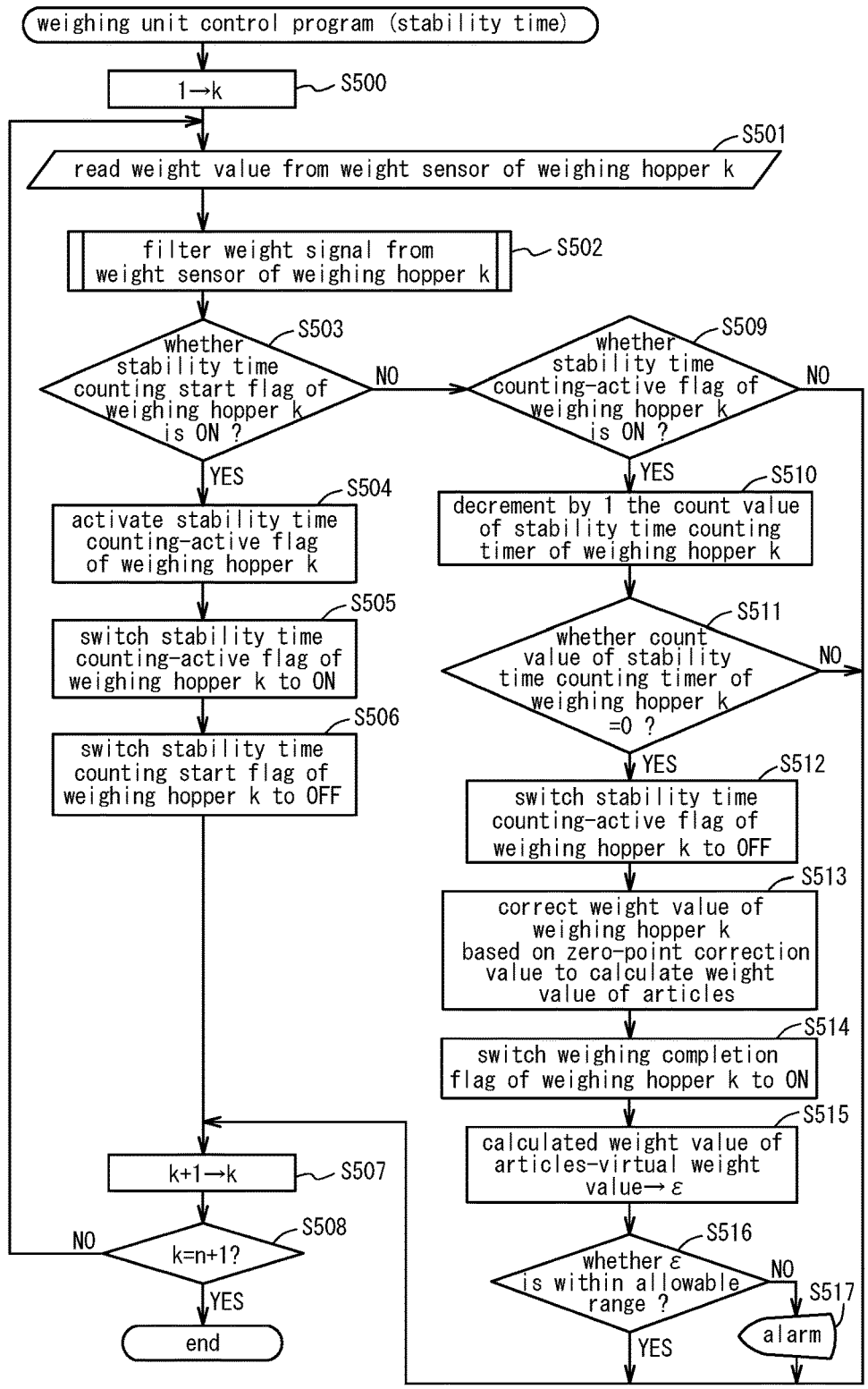
FIG. 11 is a flow chart of processing steps in connection with a weighing unit.

FIG. 11 is a flow chart of steps of a weighing unit control program in Step S104 of FIG. 7, including steps of determining adequacy or inadequacy of the stability time.

First, the computation controller sets an initial value "1" as number k used to identify the first one of the weighing hoppers 8 (Step S500). Then, the computation controller 30 reads the weight value from the weight signal of the weight sensor 9 associated with the weighing hopper 8 (k) (Step S501) and filters the weight signal outputted from the weight sensor 9 of the weighing hopper 8 (k) (Step S502). The computation controller 30 determines whether a stability time counting start flag of the weighing hopper 8 (k) is "ON", indicating that its stability time should start to be counted (Step S503). When determined that the stability time counting start flag is "ON", the computation controller 30 prompts a built-in stability time counting timer associated with the weighing hopper 8 (k) to start to count the stability time (Step S504). The computation controller 30 further switches a stability time counting-active flag to "ON", indicating that the stability time of the weighing hopper 8 (k) is currently counted (Step S505). Then, the computation controller switches the stability time counting start flag of the weighing hopper 8 (k) to "OFF" (Step S506), and proceeds to Step S507.

When determined in Step S503 that the stability time counting start flag of the weighing hopper 8 (k) is not "ON", the computation controller 50 determines whether the stability time counting-active flag of the weighing hopper 8 (k) is "ON, indicating that the stability time is currently counted (Step S509). When determined that the stability time counting-active flag is "ON", the computation controller 30 decrements by 1 the count value of the stability time counting timer associated with the weighing hopper 8 (k) (Step S510) and proceeds to Step S511. The steps illustrated in FIG. 11 are performed at regular time intervals, in which the count value of the stability time counting timer is decremented by 1 to count the stability time of the weighing hopper 8 (k).

In Step S511, the computation controller 30 determines whether the count value of the stability time counting timer associated with the weighing hopper 8 (k) is "0", i.e., whether the stability time counting timer is counted up, indicating that the stability time has passed.

When determined in Step S511 that the stability time counting timer associated with the weighing hopper 8 (k) is "0", indicating that the stability time has passed, the computation controller 30 switches the stability time counting-active flag of the weighing hopper 8 (k) to "OFF" (Step S512). The computation controller 30 then corrects the weight value of the weighing hopper 8 (k) obtained from the filtered weight signal based on the corrected zero-point correction value to calculate the weight of the articles (Step S513). Then, the computation controller 30 switches a weighing completion flag of the weighing hopper 8 (k) to "ON" (Step S514), and subtracts the virtual weight value of the weighing hopper 8 (k) from the calculated weight value of the articles in the weighing hopper 8 (k) to calculate a difference ε (Step S515). Further, the computation controller 30 determines whether the difference ε falls within an allowable range (Step S516). When determined that the difference ε falls within the allowable range, the computation controller 30 determines that the set stability time is adequate, and then proceeds to Step S507. When determined that the difference ε is beyond the allowable range, indicating that the set stability time is inadequate, the computation controller 30 displays a warning indication on the operation setting display unit 15 (Step S517), and then proceeds to Step S507.

In Step S507, the computation controller 30 adds "1" to the number k that identifies the weighing hopper 8 and determines whether the number k equals to "n+1", i.e., whether all of the weighing hoppers 8 have been processed (Step S508). When determined that the number k is not equal to "n+1", the computation controller 30 returns to Step S501 and processes the next weighing hopper 8 likewise. When determined in Step S508 that the number k equals to "n+1", the processing steps end.

Figure 12:
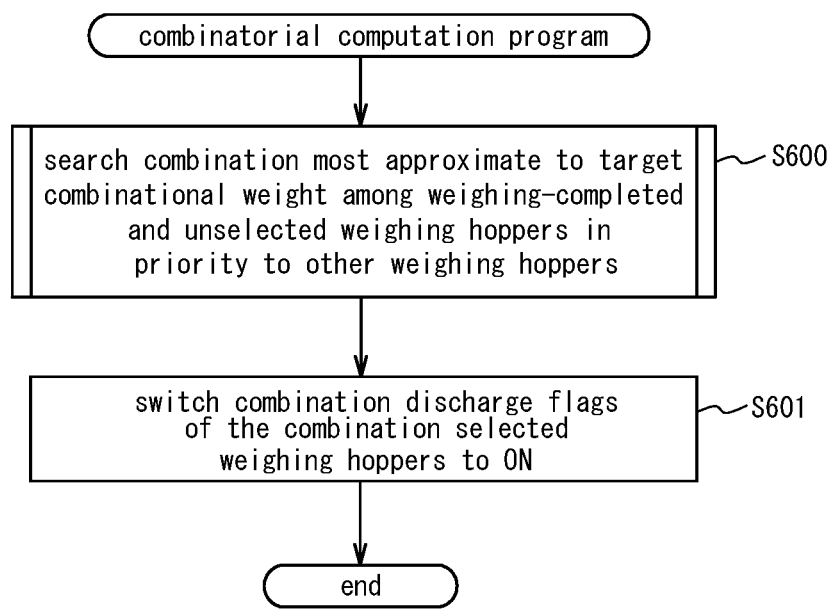
FIG. 12 is a flow chart of processing steps of combinatorial computations.

FIG. 12 is a flow chart of steps of a combinatorial computation program in Step S106 of FIG. 7.

Of all of the weighing hoppers 8 that have been weighed, any weighing hoppers 8 left unselected as an optimal quantity combination at least a predetermined number of times are identified. Then, the search of an optimal quantity combination of weighing hoppers 8 most approximate to the target combinational weight starts with the weighing hoppers 8 thus identified in priority to the others (Step S600). Then, combination discharge flags of the selected weighing hoppers 8 are switched to "ON", indicating that the articles should be discharged from these weighing hoppers (Step S601), and the processing steps end.

Figure 13:
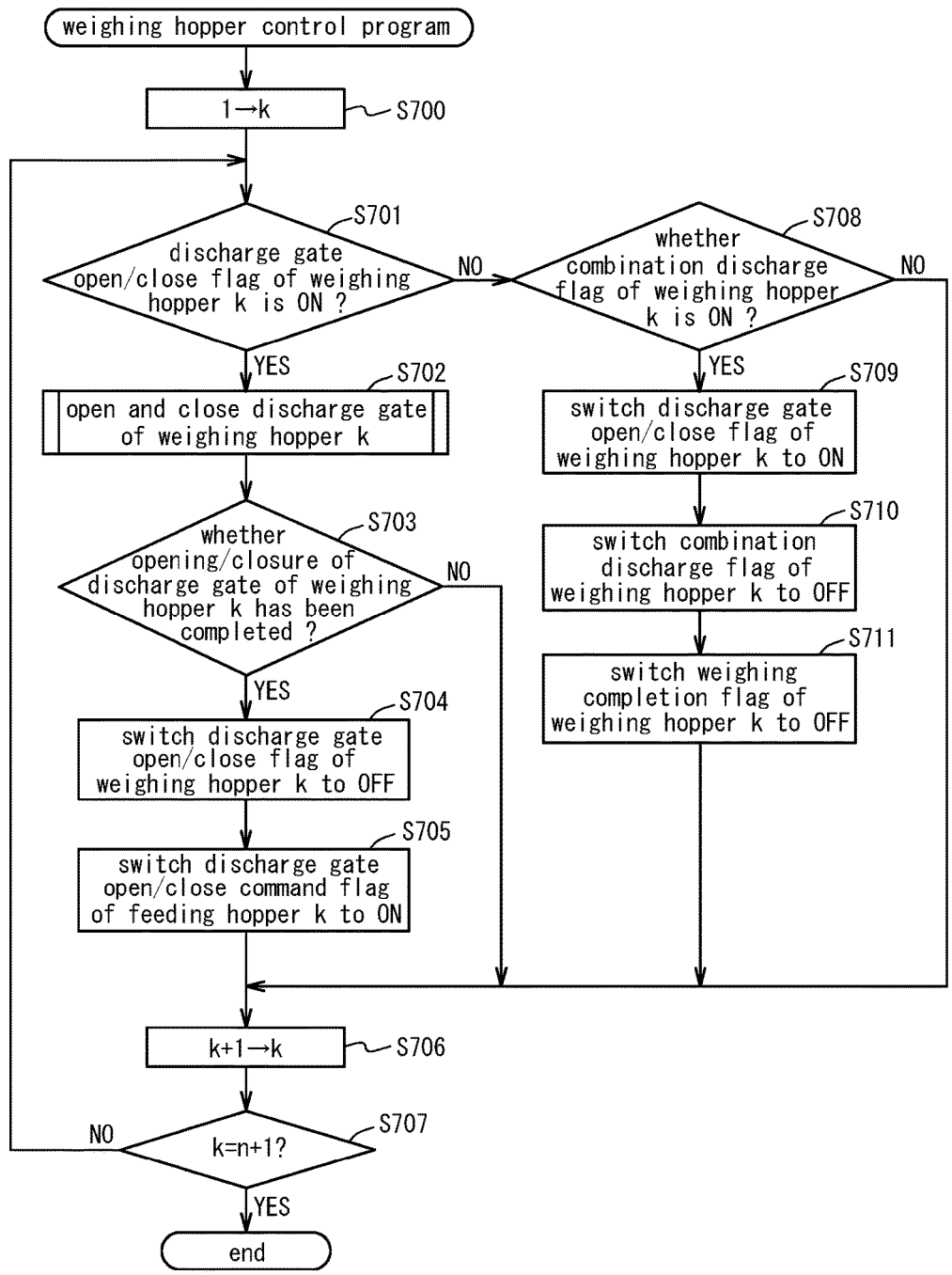
FIG. 13 is a flow chart of processing steps in connection with a weighing hopper.

FIG. 13 is a flow chart of steps of a weighing hopper control program in Step S108 of FIG. 7.

To start with, the computation controller 30 sets an initial value "1" as number k used to identify the first one of the weighing hoppers 8 (Step S700) and determines whether the discharge gate open/close flag of the weighing hopper 8 (k) is "ON", indicating that its discharge gate 8a should be opened and closed (Step S701). When determined in Step S701 that the discharge gate open/close flag of the weighing hopper 8 (k) is "ON", the computation controller 30 opens and closes the discharge gate 8a of the weighing hopper 8 (k) (Step S702), and determines whether the opening and closure of the discharge gate 8a of the weighing hopper 8 (k) have been completed (Step S703). When determined that the opening and closure of the discharge gate 8a of the weighing hopper 8 (k) have been completed, the computation controller 30 proceeds to Step S704. When determined that the opening and closure of the discharge gate 8a of the weighing hopper 8 (k) have yet to be completed, the computation controller 30 proceeds to Step S706.

In Step S704, the computation controller 30 switches the discharge gate open/close flag of the weighing hopper 8 (k) to "OFF". Since the discharge gate 8a of the weighing hopper 8 (k) has been opened and closed to discharge the virtually fed articles, the computation controller 30 switches the discharge gate open/close command flag of the feeding hopper 5 (k) associated with the weighing hopper 8 (k) to "ON" to virtually feed new articles to be weighed (Step S705), and then proceeds to Step S706.

When determined in Step S701 that the discharge gate open/close flag of the weighing hopper 8 (k) is not "ON", the computation controller 30 determines whether the combination discharge flag of the weighing hopper 8 (k) is "ON" (Step S708). When determined that the combination discharge flag of the weighing hopper 8 (k) is "ON", the computation controller 30 switches the discharge gate open/close flag of the weighing hopper 8 (k) to "ON" (Step S709), switches the combination discharge flag of the weighing hopper 8 (k) to "OFF" (Step S710), and switches the weighing completion flag of the weighing hopper 8 (k) to "OFF" (Step S711), thereafter proceeding to Step S706.

When determined in Step S708 that the combination discharge flag is not "ON", the computation controller 30 proceeds to Step S706.

In Step S706, the computation controller 30 adds "1" to the number k that identifies the weighing hopper 8 and determines whether the number k equals to "n+1", i.e., whether all of the weighing hoppers 8 have been processed (Step S707). When determined that the number k is not equal to "n+1", the computation controller 30 returns to Step S701 and processes the next weighing hopper 8 likewise. When determined in Step S707 that the number k equals to "n+1", the processing steps end.

According to this embodiment, the combination scale automatically determines whether the previously set stability time is adequate. In one or more other embodiments of this embodiment, during the dummy run mode, waveforms of the filtered weight signals may be displayed on the operation setting display unit 15, as well as a cursor indicating the timing of the previously set stability time, to allow the operator to visually check based on the displayed waveforms and cursor whether the vibrations of the weight signals have been attenuated by the time when the stability time is over, thereby determining whether the previously set stability time is adequate.

Second Embodiment

In the combination scale installed in the field site, external vibrations including floor vibrations may be superimposed on the weight signals as vibrational components, which are removed by the filtering unit 38.

The filter characteristics of the filtering unit 38 (cutoff frequency, damping property) are decided on the basis of a filter constant set therein and required to deal with the vibrational components superimposed on the weight signals.

The vibrational components superimposed on the weight signals are, however, variable with installation conditions and/or other factors. This makes it necessary to determine whether a previously set filter constant is adequate for the installation site of the combination scale.

In one or more other embodiments of this invention, therefore, an additional scheme is provided that enables adequacy or inadequacy of the preset filter constant to be determined during the dummy run mode.

Figure 14:
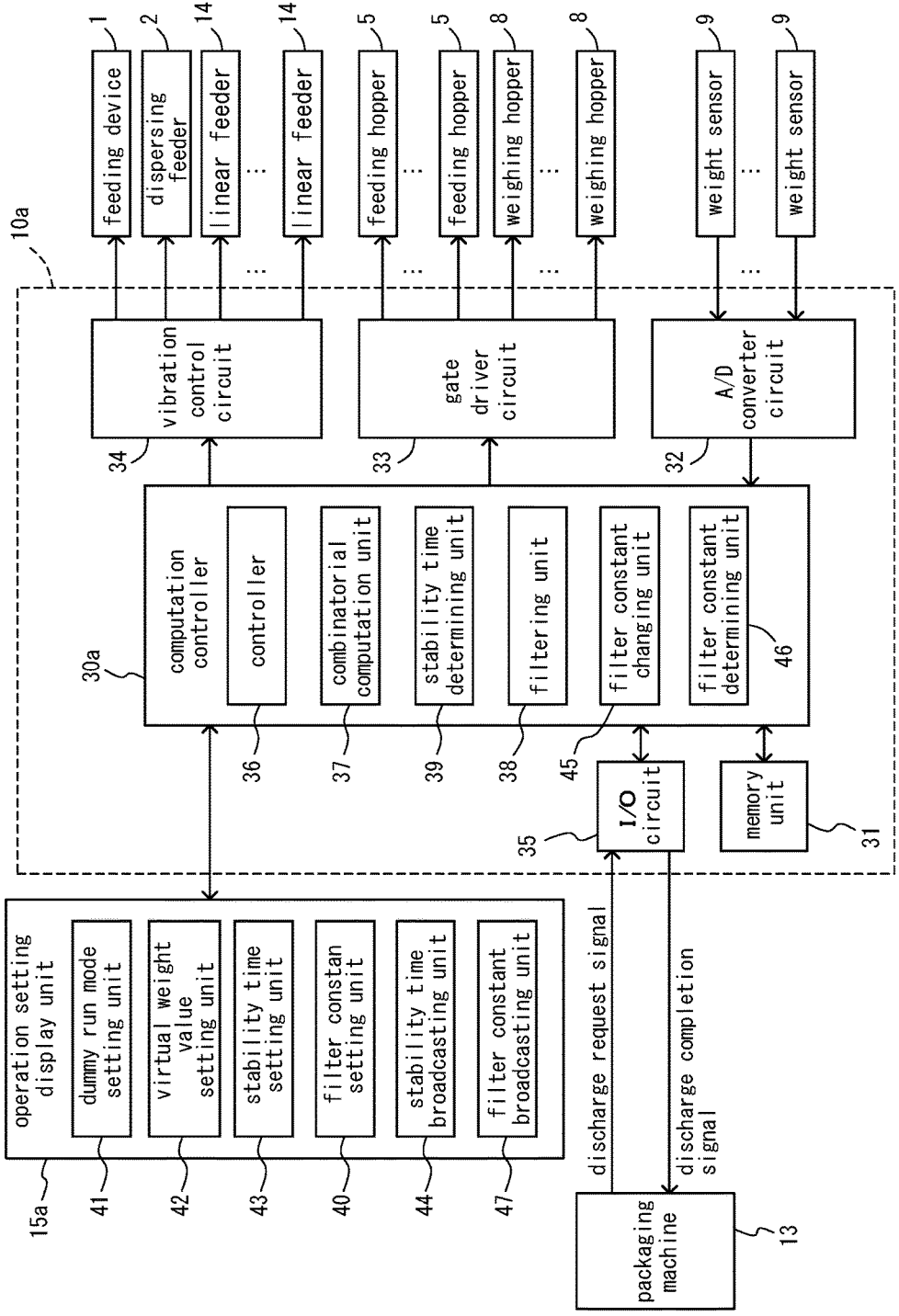
FIG. 14 is a schematic block diagram of a control system of a combination scale according to another embodiment of the invention.

FIG. 14 is a schematic block diagram of a control system of a combination scale according to another embodiment of the invention illustrated similarly to FIG. 2, wherein adequacy or inadequacy of a currently previously set filter constant is determinable. The same structural elements as those of FIG. 2 are illustrated with the same reference signs.

A computation controller 30a according to this embodiment includes functions of a filter constant changing unit 45 configured to change the filter constant of the filtering unit 38 set by manipulating an operation setting display unit 15a as described later. The computation controller 30a further includes functions of a filter constant determining unit 46 configured to determine whether the set filter constant is adequate based on the weight signal filtered by the filtering unit 38.

The filter constant adequately set may successfully shorten a length of time that takes to stabilize the filtered weight signal. This embodiment changes the filter constant into a filter constant wherein a response time becomes long and a filter constant wherein a response time becomes short. Then this embodiment includes determining whether the previously set filter constant is adequate based on a length of time required to stabilize the weight signal filtered as per the filter characteristics corresponding to the previously set filter constant and a length of time required to stabilize each of the weight signals filtered as per each of the filter characteristics corresponding to each of filter constants changed so as to have a response time be prolonged and be shortened.

The operation setting display unit 15a includes functions of a filter constant broadcasting unit 47 configured to display thereon an indication of inadequacy of the previously set filter constant and presented to an operator when the filter constant determining unit 46 of the computation controller 30a determines that the previously set filter constant is inadequate.

The computation controller 30a determines adequacy or inadequacy of the previously set filter constant as hereinafter described.

The filtering unit 38 of the computation controller 30a is a variable filter having filter characteristics adjustable correspondingly to the filter constant set by the operation setting display unit 15a functioning as a filter constant setting unit. The filtering unit 38 is operable to change and reset the filter constant by stages through manipulation of the operation setting display unit 15a. By thus setting the filter constant, the filter characteristics are automatically adjustable.

During a dummy run of the combination scale, the computation controller 30a counts a first length of time required to stabilize the weight signal filtered as per the filter characteristics adjusted correspondingly to the previously set filter constant. The computation controller 30a automatically adjusts the previously set filter constant in accordance with the filter characteristics changed by a stage so as to have a response time be prolonged, and counts a second length of time required to stabilize the weight signal filtered as per the changed filter characteristics. Further, the computation controller 30a automatically adjusts the previously set filter constant in accordance with the filter characteristics changed by a stage so as to have a response time be shortened, and counts a third length of time required to stabilize the weight signal filtered as per the changed filter characteristics.

As with the stability time, the first to third lengths of time start to be counted when the discharge gates 5a of the feeding hoppers 5 are opened.

The weight signal is determined as stable when, for example, the variation width of latest sampling signals obtained by sampling the weight signal at certain sampling intervals falls within a certain range of variation widths.

When the counted first length of time associated with the previously set filter constant is less than or equal to the second length of time associated with the filter constant changed by a stage so as to have a longer response time than the previously set filter constant and is less than or equal to the third length of time associated with the filter constant changed by a stage so as to have a shorter response time than the previously set filter constant, the previously set filter constant is determined as adequate.

When the counted first length of time associated with the previously set filter constant is greater than the second length of time associated with the filter constant changed by a stage so as to have a longer response time than the previously set filter constant and is greater than the third length of time associated with the filter constant changed by a stage so as to have a shorter response time than the previously set filter constant, the previously set filter constant is determined as inadequate.

Thus, the previously set filter constant is determined as adequate in so far as the first length of time that takes to stabilize the weight signal filtered as per the filter characteristics corresponding to the previously set filter constant is short enough to be less than or equal to the second and third lengths of time, the previously set filter constant is determined as adequate.

When the previously set filter constant is determined as inadequate, an indication of the fact is displayed on the operation setting display unit 15a and presented to the operator.

This embodiment is similar in any other aspects to the first embodiment.

According to this embodiment, the combination scale automatically determines whether the previously set filter constant is adequate. In one or more other embodiments, the combination scale may be configured to allow the operator to determine adequacy or inadequacy.

The operator may manipulate the operation setting display unit 15a to activate a filter constant adequacy/inadequacy determining mode and display on the operation setting display unit 15a the waveform of the filtered weight signal, as well as the stability time passing timings, during the dummy run mode.

This may allow the operator to check the waveform of the weight signal displayed on the operation setting display unit 15a to determine that the previously set filter constant is adequate when the associated weight signal is found to be stable or to determined that the set filter constant is inadequate when the associated weight signal is found to be unstable.

To meet the needs for a higher weighing speed, it may not be possible to set long stability time in combination scales. A possible option in such combinations scales is variable filter characteristics of the filtering unit 38.

According to this embodiment, when the filter constant of the filtering unit 38 is found to be inadequate within the previously set stability time, the filter constant may be changed and set, while the stability time is kept unchanged.

This embodiment may advantageously enable the installed combination scale to determine in its installation site whether the previously set filter constant is adequate or inadequate during the dummy run mode without actually feeding articles to be weighed.

The dummy run mode, instead of being activated after the combination scale installed in the field site, may be activated before the combination scale starts its actual operation.

DESCRIPTION OF REFERENCE SIGNS

1 feeding device
2 dispersing feeder
5 feeding hopper
8 weighing hopper
9 weight sensor
10 control device
13 packaging machine
14 linear feeder
15 operation setting display unit
30, 30a computation controller
36 controller
37 combinatorial computation unit
38 filtering unit
39 stability time determining unit
41 dummy run mode setting unit
42 virtual weight value setting unit
43 stability time setting unit
44 stability time broadcasting unit
45 filter constant changing unit
47 filter constant broadcasting unit

The invention claimed is:

1. A combination scale, comprising:
a dispersing feeder configured to receive and convey articles to be weighed to its periphery;
a plurality of linear feeders disposed around the dispersing feeder and configured to deliver the articles received from the dispersing feeder and discharge the articles from delivery terminal ends thereof;

a plurality of feeding hoppers configured to temporarily store therein the articles discharged from the delivery terminal ends of the linear feeders and discharge the articles downward;

a plurality of weighing hoppers configured to temporarily store therein the articles discharged from the feeding hoppers and discharge the articles;

a plurality of weight sensors configured to detect weights of the weighing hoppers;

a combinatorial computation unit configured to correct weight values obtained from weight signals of the weight sensors based on zero-point correction values respectively associated with the weighing hoppers, the combinatorial computation unit being further configured to calculate weight values of the articles stored in the weighing hoppers and execute combinatorial computations based on the calculated weight values of the articles; and a control device configured to control the weighing hoppers based on a result obtained from the combinatorial computations, the control device being further configured to control the dispersing feeder, the linear feeders, and the feeding hoppers, the combination scale further comprising:

a dummy run mode setting unit configured to set a dummy run mode for a dummy run of the combination scale to be performed without actually feeding the combination scale with the articles to be weighed; and a virtual weight value setting unit configured to set virtual weight values of the articles assumed to be stored in the weighing hoppers that are actually empty, wherein during the dummy run mode, the combinatorial computation unit calculates the weight values of the articles by correcting the weight values obtained from the weight signals of the weight sensors based on corrected zero-point correction values, the corrected zero-point correction values being obtainable by correcting the zero-point correction values initially provided based on the virtual weight values.

2. The combination scale as claimed in claim 1, wherein the zero-point correction values initially provided include tare weights obtained from the weight signals of the weight sensors when the weighing hoppers are empty, and the corrected zero-point correction values include values obtained by correcting the tare weights so that the weight values of the articles calculated by the combinatorial computation unit are equal to the virtual weight values set by the virtual weight value setting unit.

3. The combination scale as claimed in claim 1, further comprising a filtering unit configured to filter the weight signals of the weight sensors, wherein the combinatorial computation unit obtains the weight values from the weight signals filtered by the filtering unit.

4. The combination scale as claimed in claim 3, further comprising:

a stability time setting unit configured to set stability time that defines a timing of obtaining the weight value from each of the weight signals filtered by the filtering unit; and a stability time determining unit configured to determine during the dummy run mode whether the stability time previously set is adequate, wherein the stability time determining unit determines during the dummy run mode whether the stability time previously set is adequate based on the weight values of the articles calculated by the combinatorial computation unit and the virtual weight values set by the virtual weight value setting unit.

5. The combination scale as claimed in claim 4, further comprising a stability time broadcasting unit configured to broadcast inadequacy of the stability time previously set when the stability time determining unit determines the stability time as inadequate.

6. The combination scale as claimed in claim 3, wherein the filtering unit has filter characteristics variable with a filter constant set therein, the filtering unit comprising:

a filter constant setting unit configured to set the filter constant of the filtering unit;

a filter constant changing unit configured to change the filter constant previously set so as to have a response time be prolonged and shortened respectively during the dummy run mode; and a filter constant determining unit configured to determine during the dummy run mode whether the filter constant previously set is adequate based on a length of time required to stabilize each of the weight signals filtered as per the filter characteristics corresponding to the filter constant previously set and a length of time required to stabilize each of the weight signals filtered as per the filter characteristics corresponding to each of the filter constants changed by the filter constant changing unit.

7. The combination scale as claimed in claim 6, wherein the filtering unit further includes a filter constant broadcasting unit configured to broadcast inadequacy of the filter constant previously set when the filter constant determining unit determines the filter constant as inadequate.

* * * * *